United States Patent [19]

Tsukagoshi

[11] Patent Number: 5,684,542
[45] Date of Patent: Nov. 4, 1997

[54] VIDEO SUBTITLE PROCESSING SYSTEM

[75] Inventor: Ikuo Tsukagoshi, Tokyo, Japan

[73] Assignee: Sony Corporation, Japan

[21] Appl. No.: 360,095

[22] Filed: Dec. 20, 1994

[30] Foreign Application Priority Data

Dec. 21, 1993 [JP] Japan ................................. 5-321499

[51] Int. Cl.$^6$ .............................. H04N 7/08; H04N 7/00
[52] U.S. Cl. ......................... 348/468; 348/462; 348/465; 348/467; 348/564
[58] Field of Search ........................ 348/468, 465–467, 348/473, 476–479, 480, 482, 419, 422, 423, 462; 345/199, 200; H04N 7/00, 11/00, 7/08, 5/445

[56] References Cited

U.S. PATENT DOCUMENTS

| | | |
|---|---|---|
| 4,471,377 | 9/1984 | Mogi et al. .......................... 348/468 |
| 4,712,099 | 12/1987 | Maeda ................................ 345/199 |
| 4,845,662 | 7/1989 | Tokumitsu .......................... 348/468 |
| 4,853,681 | 8/1989 | Takashima .......................... 345/199 |
| 5,134,484 | 7/1992 | Wilson ................................ 348/564 |

*Primary Examiner*—Michael H. Lee
*Attorney, Agent, or Firm*—Limbach & Limbach L.L.P.

[57] ABSTRACT

A video subtitle processing system encoding unit which allows display of high quality subtitle in accordance to a preference of an user, to switch the display of the subtitle quickly without degrading the background video image and to transmit and display the colored subtitle with less data amount are provided. The subtitle data encoding unit comprises a color lookup table as memory means for storing color data and a color quantization circuit as detecting means for detecting an address in memory for storing the color data which corresponds to a color of the subtitle, and is characterized in that the address in the memory means detected by the color quantization circuit is coded and transmitted as color information concerning on the color of the subtitle.

11 Claims, 23 Drawing Sheets

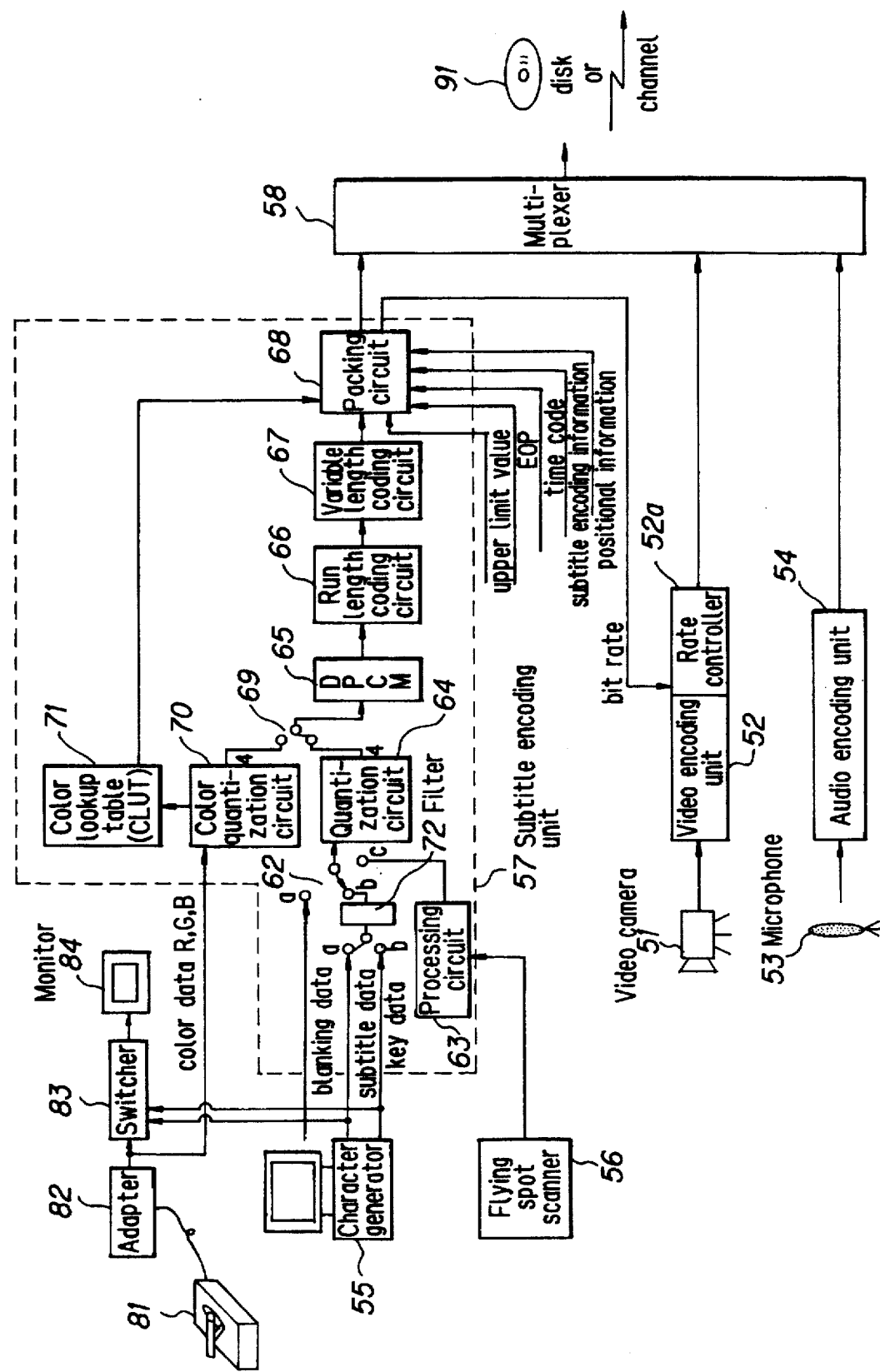

FIG.8

| vlc code | RL | BL(*) |
|---|---|---|
| "0000" | Start Zero Run | 4 |
| "11111" | ESC for extention | 5 |
| "11111111" | End Of Line | 7 |
| "0" | 1 | 1 |
| "10" | 2 | 2 |
| "110" | 3 | 4 |
| "11010" | 4 | 5 |
| "110110" | 5 | 6 |
| "110111" | 6 | 6 |
| "111000" | 7 | 6 |
| "111001" | 8 | 6 |
| "1110100" | 9 | 7 |
| "1110101" | 10 | 7 |
| "1110110" | 11 | 7 |
| "11101110" | 12 | 8 |
| "11101111" | 13 | 8 |
| "11110000" | 14 | 8 |
| "11110001" | 15 | 8 |
| "11110010" | 16 | 8 |
| "111100110" | 17 | 9 |
| "111100111" | 18 | 9 |
| "111101000" | 19 | 9 |
| "111101001" | 20 | 9 |
| "111101010" | 21 | 9 |
| "111101011" | 22 | 9 |
| "111101100" | 23 | 9 |
| "111101101" | 24 | 9 |
| "111101110" | 25 | 9 |
| "111101111" | 26 | 9 |
| "0000011011" | 27 | 10 |
| "0000011100" | 28 | 10 |
| "0000011101" | 29 | 10 |
| "0000011110" | 30 | 10 |
| "0000011111" | 31 | 10 |
| "0000100000" | 32 | 10 |
| "0000100001" | 33 | 10 |
| "0000100010" | 34 | 10 |
| "0000100011" | 35 | 10 |
| "0000100100" | 36 | 10 |
| "0000100101" | 37 | 10 |
| "1011001010" | 714 | 10 |
| "1011001011" | 715 | 10 |
| "1011001100" | 716 | 10 |
| "1011001101" | 717 | 10 |
| "1011001110" | 718 | 10 |
| "1011001111" | 719 | 10 |

(*)RL : Run Length of input data
BL : Bit Length of vlc code

*Subtitle data stream packet structure*

FIG. 14A
pattern 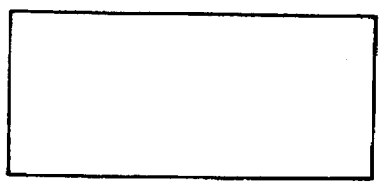
FIG. 14B
color n_th frame
FIG. 14C
switched CLUT 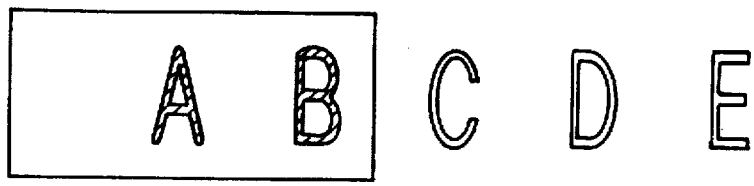
FIG. 14D
synthesized pattern+color subtitle

FIG. 15

```
/* vlc. table2 */
===================================
vlc_code              RL      BL (*)
11111110        End Of Line      8
-----------------------------------
```

| vlc code | RL | BL | | vlc code | RL | BL |
|---|---|---|---|---|---|---|
| 0 | 0 | 1 | | 11111100000 | 41 | 11 |
| 1100 | 1 | 4 | | 11111100001 | 42 | 11 |
| 11010 | 2 | 5 | | 11111100010 | 43 | 11 |
| 110110 | 3 | 6 | | 11111100011 | 44 | 11 |
| 110111 | 4 | 6 | | 11111100100 | 45 | 11 |
| 111000 | 5 | 6 | | 11111100101 | 46 | 11 |
| 111001 | 6 | 6 | | 11111100110 | 47 | 11 |
| 1110100 | 7 | 7 | | 11111100111 | 48 | 11 |
| 1110101 | 8 | 7 | | 11111101000 | 49 | 11 |
| 1110110 | 9 | 7 | | 11111101001 | 50 | 11 |
| 11101110 | 10 | 8 | | 11111101010 | 51 | 11 |
| 11101111 | 11 | 8 | | 11111101011 | 52 | 11 |
| 11110000 | 12 | 8 | | 11111101100 | 53 | 11 |
| 11110001 | 13 | 8 | | 11111101101 | 54 | 11 |
| 11110010 | 14 | 8 | | 11111101110 | 55 | 11 |
| 111100110 | 15 | 9 | | 11111101111 | 56 | 11 |
| 111100111 | 16 | 9 | | | | |
| 111101000 | 17 | 9 | | 100100011011 | 57 | 12 |
| 111101001 | 18 | 9 | | 100100011100 | 58 | 12 |
| 111101010 | 19 | 9 | | 100100011101 | 59 | 12 |
| 111101011 | 20 | 9 | | 100100011110 | 60 | 12 |
| 111101100 | 21 | 9 | | 100100011111 | 61 | 12 |
| 111101101 | 22 | 9 | | 100100100000 | 62 | 12 |
| 111101110 | 23 | 9 | | 100100100001 | 63 | 12 |
| 111101111 | 24 | 9 | | 100100100010 | 64 | 12 |
| 1111100000 | 25 | 10 | | 100100100011 | 65 | 12 |
| 1111100001 | 26 | 10 | | 100100100100 | 66 | 12 |
| 1111100010 | 27 | 10 | | 100100100101 | 67 | 12 |
| 1111100011 | 28 | 10 | | | | |
| 1111100100 | 29 | 10 | | 101111111010 | 714 | 12 |
| 1111100101 | 30 | 10 | | 101111111011 | 715 | 12 |
| 1111100110 | 31 | 10 | | 101111111100 | 716 | 12 |
| 1111100111 | 32 | 10 | | 101111111101 | 717 | 12 |
| 1111101000 | 33 | 10 | | 101111111110 | 718 | 12 |
| 1111101001 | 34 | 10 | | 101111111111 | 719 | 12 |
| 1111101010 | 35 | 10 | | | | |
| 1111101011 | 36 | 10 | | | | |
| 1111101100 | 37 | 10 | | | | |
| 1111101101 | 38 | 10 | | | | |
| 1111101110 | 39 | 10 | | | | |
| 1111101111 | 40 | 10 | | | | |

(*)RL : Run Length of input data
BL : Bit Length of vlc code subtitle display range subtitle data $Q = h \times d \times q$ Transmission Format 5,684,542

VIDEO SUBTITLE PROCESSING SYSTEM

FIELD OF THE INVENTION

The present invention relates to a video subtitle data encoder and decoder suitable for use in transmitting subtitle data together with video data so that subtitle information may be displayed in a superimposed manner on a video image with reduced degradation of video image quality.

BACKGROUND OF THE INVENTION

Typically, when one watches, for example, a foreign movie, a textual subtitle is often superimposed on the display screen along with video imagery. In video, disks or ordinary TV broadcasting, video signals are transmitted in a state in which subtitles have been superimposed beforehand on the video images. In currently known systems, such as CAPTAIN and CD-G, subtitles may be transmitted as character codes or dot patterns.

CD-G is adapted to be able to record graphics utilizing subcodes and utilizing that, it is also possible to record subtitles in a CD. In the CD-G, one frame of data is composed of one byte subcode and 32 byte data, as shown in FIG. 22. In the 32 byte data, six samples of two byte data per sample are allocated to L and R channels, respectively. Accordingly, the total is 24 bytes. Then, an eight byte error correction code is added to the 24 byte audio data; resulting in the data of 32 bytes in total.

On the other hand, 98 frames of subcodes are assembled to compose one block. Among the 98 frames of subcodes, the first two frames of subcodes are allocated for sync patterns S0 and S1. Various subcode data may be recorded in the remaining 96 frames of subcodes. However, among one byte subcodes (each bit is represented by P through W) data for searching a track has been already allocated for data in P and Q channel. Then, graphic data may be allocated with 6 bits in the remaining R Channel through W channel. That is, a substantial range in which the graphic data can be allocated is 6×96 bits.

Because one block data is transmitted with a frequency of 75 Hz, an amount of one frame of data transferred is 75×98 Hz. Accordingly, the bit rate for transmitting the subcodes is 7.35 kbyte/s.

FIG. 23 shows a transmission format of such graphic data. As shown in the figure, a packet is composed of 96 symbols of data, with one symbol being 6 bit data from R channel through W channel, and each packet is composed of four packs. Each pack is composed of 24 symbols from symbol 0 to symbol 23. Mode information is allocated to three bits of R, S and T in the symbol 0 and item information is allocated to three bits of U, V and W, respectively. The following modes are defined by combining such modes and items:

MODE ITEM
000 000 Zero Mode
001 000 Graphic Mode
001 001 TV-graphic Mode
111 000 User Mode Then, an instruction is allocated to the symbol 1 and the mode and parity bits for the item and instruction are allocated to the symbols 2 and 3, so that a substantial range to which graphic data can be allocated is 12 symbols, for example, as shown in FIG. 23 among the symbols from symbol 4 through symbol 19. Parity bits for 20 symbols from the symbol 0 through symbol 19 are allocated to four symbols from symbol 20 through symbol 23.

Graphic data can be thus allocated as binary data in the range of 6×12 pixels of each pack in the CD-G. Because the rate of the pack is 75×4=300 packs/s, 300 characters may be transmitted per one second if one character is allocated in this range of 6×12 pixels.

Further, because one screen defined in the CD-G is 288 horizontal pixels×192 lines, it takes 2.56 seconds to transmit this one screen of characters as shown in the following expression:

$$(288/6) \times (192/12)/300 = 2.56$$

Still more, because different patterns have to be transmitted four times per one character pattern if a hexadecimal representation is made in each pixel, it takes 10.24 seconds which is four times of the above time.

By the way, among such conventional methods, there has been a disadvantage that an user cannot turn on or off a displayed subtitle arbitrary in the method by which the subtitle superimposed on a video image is transmitted, like the video disk and normal TV broadcasting. Further, there has been another disadvantage in them that they do not allow to prepare subtitles in a plurality of languages and to let the user select certain one.

Contrary to that, although the method in the CAPTAIN system and CD-G allows to arbitrary turn on off the display of the subtitle, it has a disadvantage that its resolution is not good enough.

That is, whereas a displayable area of one screen is 248 horizontal pixels×192 lines in the CAPTAIN system, component digital TV signal has a resolution of 720 horizontal pixels×480 lines, and it can be seen that the resolution of the former is not as good as compared to the resolution of the latter.

Furthermore, because only one bit data can be accommodated per one pixel in the CD-G, data is represented by binarizing it. Accordingly, there has been a disadvantage that such phenomena as an aliasing phenomenon by which slanted portions of a character appears in zig-zag and a flicker phenomenon by which characters flicker become significant, giving an unpleasant feeling to the user.

Although it is conceivable to convert the binary information to multi-valued information by means of a filter for example, it requires a high precision filter and hence increases the cost. The use of such filter may also degrade the background image.

If one pixel is represented in hexadecimal in the CD-G, it takes about four times the amount of time when it is displayed in binary and it becomes difficult to switch the display of subtitles quickly. Further, because the data rate is low in the method in the CAPTAIN system and CD-G, it has been difficult to display subtitles which dynamically change timewise.

Accordingly, it is an object of the present invention to solve the aforementioned problems by providing means which allows to display a high quality subtitle in accordance to a preference of an user, to switch the display of the subtitle quickly without degrading the background video image and to display the subtitle which dynamically changes timewise with less data amount.

SUMMARY OF THE INVENTION

The subtitle data encoding unit of the present invention for encoding a subtitle to be superimposed on a video image and to be displayed comprises a color lookup table (CLUT) 71 as memory means for storing color data and a color quantization circuit 70 as detecting means for detecting an address in the CLUT 71 for storing color data which corresponds to a color of the subtitle, and is characterized in that the address detected by the color quantization circuit 70 is transmitted as color information concerning on the color of the subtitle.

The subtitle data encoding unit is characterized in that it transmits, in addition to the color information, pattern information concerning on a pattern of the subtitle and a repeat time which is a number of vertical synchronous signals in the video image on which the subtitle is continuously superimposed.

The subtitle data encoding unit for encoding a subtitle to be superimposed on a video image and to be displayed comprises range specifying means (e.g., Step S53 in a program in FIG. 16) for specifying a range in which the subtitle is to be displayed, bit number determining means (e.g., Step S55 in the program in FIG. 16) for determining a bit number per one pixel in quantizing the subtitle, encoding means (e.g., Step S58 in the program in FIG. 16) for encoding in correspondence with values determined by the range specifying means and bit number determining means, and correcting means (e.g., Step S60 in the program in FIG. 16) for correcting the values determined by the range specifying means and bit number determining means in correspondence with an amount of codes encoded by the encoding means.

This subtitle data encoding unit may be further provided with adjusting means (e.g., Step S54 in the program in FIG. 16) for adjusting a horizontal resolution of the subtitle.

The recording medium according to one aspect of the invention is characterized in that it records the data of subtitle encoded by the subtitle data encoding unit described above.

According to another aspect of the invention, a subtitle data decoding unit for decoding data of the subtitle encoded by the subtitle data encoding unit and containing, in addition to the color information, the pattern information concerning on a pattern of the subtitle comprises a pattern decoder 100 as pattern information decoding means for decoding the pattern information and a color decoder 101 as color information decoding means for decoding the color information, and is characterized in that the pattern decoder 100 or color decoder 101 performs a process for decoding the pattern information or color information respectively in parallel.

The subtitle data decoding unit according to a further aspect of the invention is characterized in that the color decoder 101 further comprises a color lookup table (CLUT) 32 for storing color data as output means and that the CLUT 32 outputs data of a color stored at an address when the address is specified, that the color information is the address for outputting a color rectangular area (frame) composed of color data from the CLUT 32 and that the address which is the color information may be modified corresponding to the pattern information.

The subtitle data decoding unit according to yet another aspect of the invention is characterized in that the pattern information contains at least data of brightness of the subtitle and further comprises an arithmetic unit 33 as multiplication means for multiplying the output of the CLUT 32 and the brightness data.

The subtitle data decoding unit according to another aspect of the invention is characterized in that the pattern information is composed of either of the subtitle brightness data or key data which corresponds to a mute factor of the video signal in superimposing the subtitle and discrimination information for discriminating either of them and that the address which is the color information is modified corresponding to the discrimination information.

According to another aspect of the invention, the subtitle data decoding unit for decoding the data encoded by the subtitle data encoding unit comprises a code buffer 22 or 28 as data storage means for storing the data and is characterized in that the data stored in the code buffer 22 or 28 is repeatedly decoded by a number of times of the repeat time.

The subtitle data decoding unit according to another aspect of the invention is characterized in that the repeat time is decremented, when a n-time speed reproduction is made, by one with a timing of n times of a timing of the vertical synchronous signal of the video image and that the data stored in the code buffer 22 or 28 is repeatedly decoded until the repeat time becomes zero.

According to the subtitle data encoding unit, an address in the CLUT 71 storing data of colors which correspond to colors of a subtitle is detected and the address is transmitted as color information concerning on the color of the subtitle, so that the colored subtitle may be transmitted with less information amount.

According to the subtitle data encoding unit according to another aspect of the invention, pattern information concerning on a pattern of a subtitle and a repeat time which is a number of vertical synchronous signals in a video image on which the subtitle is continuously superimposed are transmitted, in addition to the color information, so that the subtitle superimposed on the video image across a plurality of frames or fields may be transmitted with less data amount.

According to the subtitle data encoding unit according to a further aspect of the invention, the coding of the subtitle is carried out in Step S58 in the program in FIG. 16 corresponding to the display range and a number of bits specified in Steps S53 and S55, respectively. Then, the code amount is compared with the criterion value in Step S60 and the range and the number of bits are corrected corresponding to the comparison result. Accordingly, the subtitle display range may be freely changed to any range without modifying the basic structure of the subtitle data encoding unit.

According to the recording medium according to yet another aspect of the invention, it records the data of the subtitle encoded by the subtitle data encoding unit described in claim 1, so that it can store many more information other than the subtitle data.

According to the subtitle data decoding unit according to another aspect of the invention, the pattern decoder 100 or the color decoder 101 performs the process for decoding the pattern information or color information respectively in parallel, so that the decoding can be completed quickly. Further, the color information may be modified by the pattern information, so that a subtitle whose color changes timewise can be displayed with less data amount. According to the subtitle data decoding unit according to a further aspect of the invention, the color frame composed of color data is output from the CLUT 32 by giving an address which is the color information to the CLUT 32 by modifying it corresponding to the pattern information, so that the subtitle whose color changes timewise may be displayed with less data amount.

According to the Subtitle data decoding unit according to an aspect of the invention, the output of the CLUT 32 and brightness data are multiplied, so that a subtitle having a smooth edge may be displayed.

According to the subtitle data decoding unit according to another aspect of the invention, the color frame composed of color data is output from the CLUT 32 by giving an address which is color information to the CLUT 32 by modifying it corresponding to discrimination information, so that the subtitle whose color changes timewise may be displayed with less data amount.

According to the subtitle data decoding unit according to a further aspect of the invention, stored data is repeatedly decoded by a number of times of the repeat time, so that the subtitle may be superimposed on the video image across a plurality of frames or fields.

According to the subtitle data decoding unit according to another aspect of the invention, the repeat time is decremented, when a n-time speed reproduction is made, by one with a timing of n times of a timing of the vertical synchronous signals of the video image and the data is repeatedly decoded until the repeat time becomes zero, so that the subtitle may be superimposed on the video image across a predetermined plurality of frames or fields corresponding to the reproduction speed.

The above and other related objects and features of the present invention will be apparent from a reading of the following description of the disclosure found in the accompanying drawings and the novelty thereof pointed out in the appended claims.

BRIEF DESCRIPTION OF THE DRAWINGS

FIG. 1 is a block diagram showing a construction of one embodiment of an encoding unit of the present invention;

FIG. 8 is a variable length encoding (variable length decoding) table;

FIGS. 14A through 14D are drawings for explaining an operation of the CLUT 32 in FIG. 14;

FIG. 15 is a variable length encoding (variable length decoding) table;

DETAILED DESCRIPTION OF THE INVENTION

Figure 2A:
FIGS. 2A and 2B are diagrams for explaining a relation of subtitle data and key data.

Referring now to the drawings, preferred embodiments of the present invention will be explained. FIG. 1 is a block diagram showing a construction of one embodiment of a subtitle data encoding unit to which the present invention is applied. In the present embodiment, a video signal output from a video camera 51 is supplied to a video encoding unit 52, is converted from analog to digital, is compressed and then packeted. A video disk player or video tape recorder may be used of course instead of the video camera and a video signal reproduced by them may be supplied to the video encoding unit 52.

The video encoding unit 52 contains a rate controller 52a for controlling a compression ratio of the video data corresponding to a bit rate control signal output by a packing circuit 68. That is, while subtitle data is encoded in a subtitle encoding unit 57 as described later, if an amount of the encoded data is small, the overall data amount will not increase even if an amount of encoded video data is increased by that amount of the subtitle. That is, the quality of the video image may be improved to that degree. Contrary to that, when the subtitle data amount is large, a data amount allocated to the video data is decreased.

The video data (e.g., component signals of 4:2:2) thus compressed, encoded and packeted by the video encoding unit 52 is supplied a multiplexer 58. Similarly, an audio signal collected by a microphone 53 is supplied to an audio encoding unit 54 to be converted from analog to digital. Then it is compressed, encoded and packeted. A tape recorder (CD player or the like) for example may be used instead of the microphone 53 also in this case to supply an audio signal reproduced by that to the audio encoding unit 54. The audio data encoded by the audio encoding unit 54 is also supplied to the multiplexer 58.

On the other hand, subtitle data generated by a character generator 55 or that output from a flying spot scanner 56 is supplied to a subtitle data encoding unit 57 to be compressed, encoded and packeted and supplied to the multiplexer 58.

The multiplexer 58 multiplexes (e.g., time-division multiplexing) the packeted data output respectively from the subtitle encoding unit 57, video encoding unit 52 and audio encoding unit 54. After performing a process for correcting errors such as ECC and a modulation process such as EFM on the data, the multiplexer 58 records them to a recording medium such as a disk 91 and transmits to the receiver side via a channel.

Next, the subtitle encoding unit 57 will be explained further. The character generator 55 generates subtitle data which corresponds to a video image encoded by the video encoding unit 52 and supplies it to a contact (a) of a switch 61, in the subtitle encoding unit 57. The switch 61 is switched to the contact (a) or contact (b) with a predetermined timing to select subtitle data or key data as necessary to supply it, to a quantization circuit 64 via a digital filter circuit 72 and contact (b) of a switch 62.

Figure 2B:
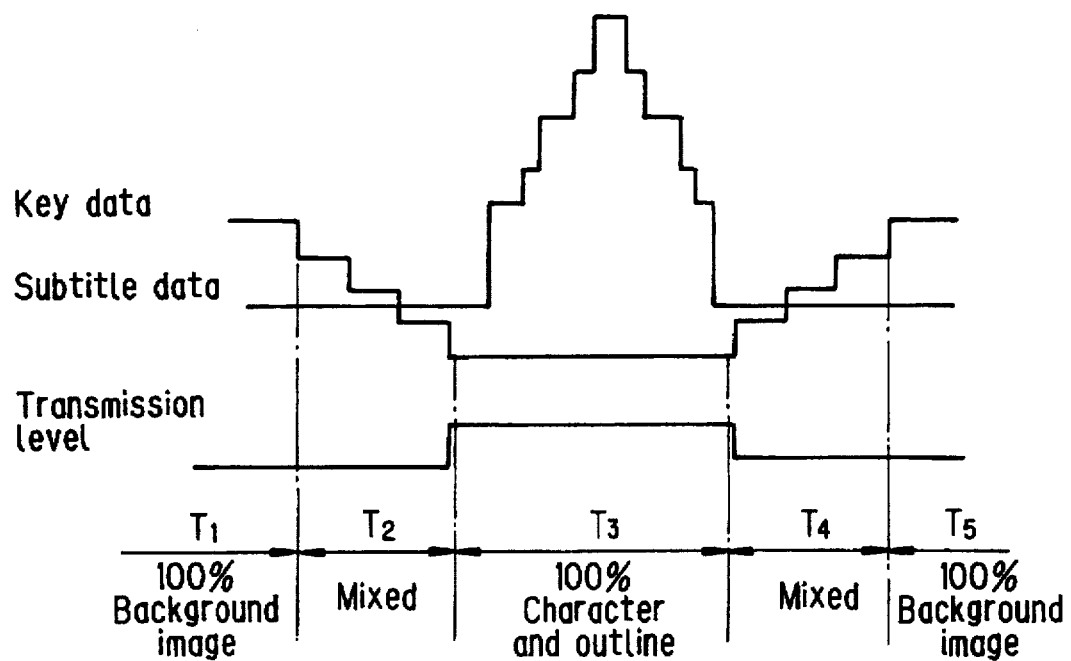

Referring now to FIGS. 2A and 2B, a relation of the key data and subtitle data (fill data) will be explained. Here assume that a character A exists as a character to be displayed in a subtitle as shown in FIG. 2A. Subtitle data of a line represented by one horizontal line in FIG. 2A is shown in FIG. 2B. As shown in FIG. 2B, the subtitle data has a level which corresponds to a brightness of the character to be displayed in a period T3. Then, in periods T1 and T2 and periods T4 and T5 before and after that, the level of the subtitle data stays at the lowest level. Accordingly, it can be said that the subtitle data is composed of a pattern of the character to be displayed and a brightness level within the pattern (pattern information concerning on subtitle pattern).

The key data, on the other hand, stays at the lowest level in the period T3 in which the character is to be displayed and becomes the highest level in the periods T1 and T5 separated before and after the period T3. Then the level in the period T2 between the periods T1 and T3 and the period T4 between the T3 and T5 is set at a predetermined intermediate level between the lowest and highest level. In the period T2, the level changes gradually from the highest, level to the lowest level and in the period T4, the level changes gradually from the lowest level to the highest level.

That is, in the period T3, the level of a video signal of the background video image is substantially muted to a black level. On the other hand, the level of a subtitle signal which corresponds to the subtitle is muted to a predetermined level (although to a predetermined gray level in the present embodiment, it may be a black level) in the periods T1 and T5. Then, in the periods T2 and T4, the background video image is muted with a ratio corresponding to the values of the key data. In the present embodiment, the greater the value of the key data, the smaller the mutation of the background video image is (the greater a mute factor of the subtitle is) and the smaller the value of the key data, the greater the ratio of mutation of the background video image is (the smaller the mute factor of the subtitle is). Thus, the background video image is substantially completely muted during the period in which the character is displayed and is gradually muted near the character, so that the subtitle (character) is kept to be easily Seen.

Figure 3:
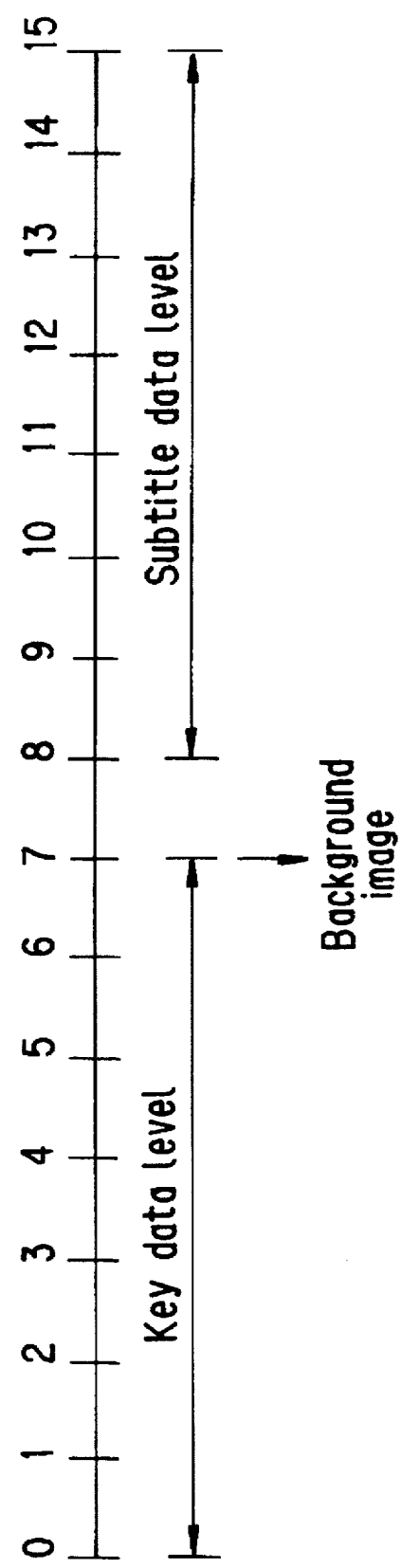
FIG. 3 is a diagram for explaining a principle for encoding the subtitle data and key data.

The quantization circuit 64 consolidates the levels of subtitle data and key data based on a predetermined quantization table included therein and represents as four bits data. FIG. 3 shows a principle for consolidating and representing the levels of subtitle data (fill data) and key data. As shown in the figure, among 16 stages of levels which can be represented by four bits, 8 stages of levels from 0 to 7 are allocated to the level of the key data and 8 stages of levels from 8 to 15 are allocated to the subtitle data. That is, the levels of the key data are represented by four bit data from 0000 to 0111 and the levels of the subtitle data are represented by four bit data from 1000 to 1111.

As a result, the MSB of the four bit data represents, so to speak, a transmission level, and when the MSB is 1, the subtitle data is displayed and when it is 0, the background video image is muted and the subtitle is displayed in the level of 0 (level of black frame). When the key data level is 7 (0111), the mute factor of the background video image becomes 0 and the background video image is represented in the level as it is.

By thus consolidating the key data and subtitle data and representing them by four bit data (since the MSB indicates the type, each level substantially represents three bit data), the four bit data may be disposed within a bit stream as substantially the same data and hence the circuit structure may be simplified. By the way, the bit allocation to the subtitle data may be any number of bits from one to four bits (when four bits are allocated to the subtitle data, the key data is ignored since there is no bit to be allocated to the key data). That is, the allocation of the levels to the subtitle data and key data may be appropriately changed.

Figure 4:
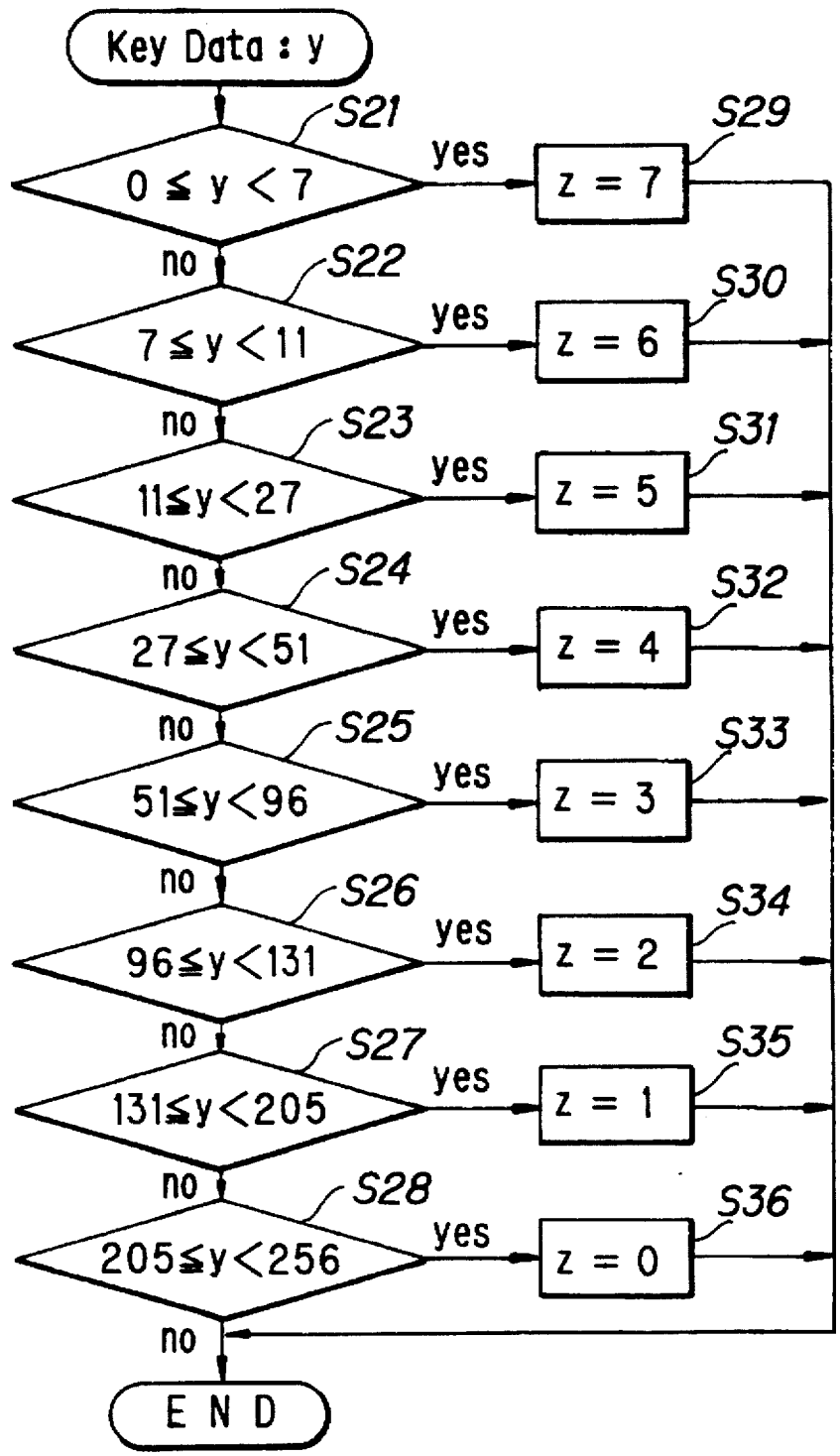
FIG. 4 is a flowchart for explaining a key data quantization operation in a quantization circuit 64 in FIG. 1.
Figure 5:
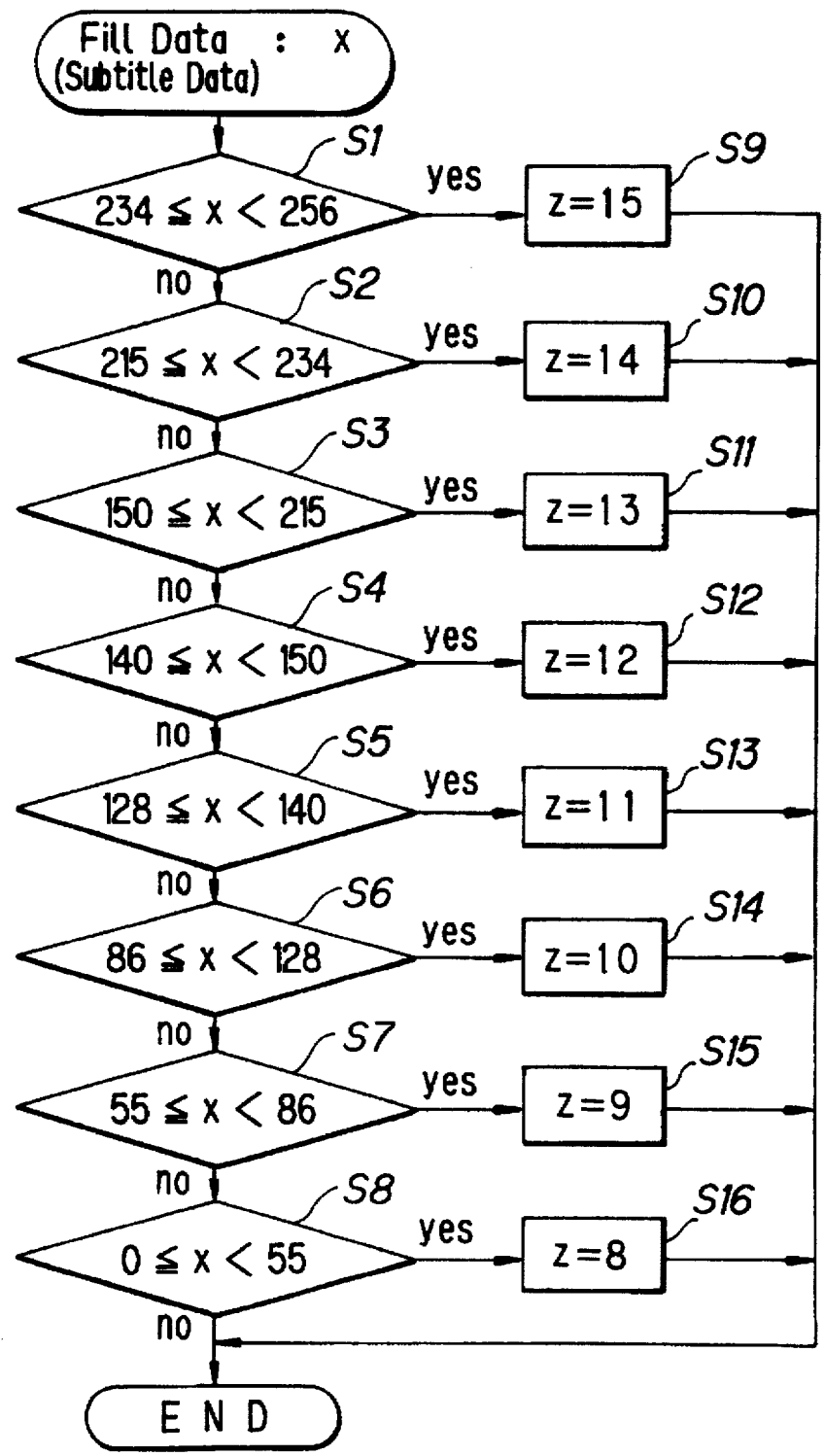
FIG. 5 is a flowchart for explaining a subtitle data quantization operation of the present invention.

FIGS. 4 and 5 show a principle for quantizing the levels of the key data and subtitle data. As shown in FIG. 4, when the key data has levels of 256 stages from 0 to 255, the quantization circuit 64 classifies the levels of 256 stages into eight ranges and discriminates into which range a value of inputted key data (y) falls in Step S21 through S28. That is, the eight ranges are: from 0 to 6, 7 to 10, 11 to 26, 27 to 50, 51 to 95, 96 to 130, 131 to 204 and 205 to 255. When it is discriminated that the value falls into either one of those ranges in Step S21 through S28, the process advances to Step 829 through S36 to output either one value of 7 (0111) through 0 (0000) as four bit quantized data (z).

Similarly, when the subtitle data has levels of 256 stages from 0 stage through 255 stage, it is discriminated into which range of 255 to 234, 233 to 215, 214 to 150, 149 to 140, 139 to 128, 127 to 86, 85 to 55 and 54 to 0 the subtitle data (fill data)×falls. When it is discriminated that it belongs to either one of those ranges, the process advances from Step S9 through S16 respectively to set either value of 15 (1111) through 8 (1000) as four bit quantization data (z).

The quantization circuit 64 is supplied with blanking data by the character generator 55 via a contact (a) of the switch 62. Various data may be inserted to the blanking data as necessary.

Furthermore, the quantization circuit 64 is supplied With subtitle data outputted by a processing circuit 63 via a contact (c) of the switch 62. The processing circuit 63 processes an analog subtitle signal outputted by the flying spot scanner 56 and outputs it as digital subtitle data.

Figure 6A:
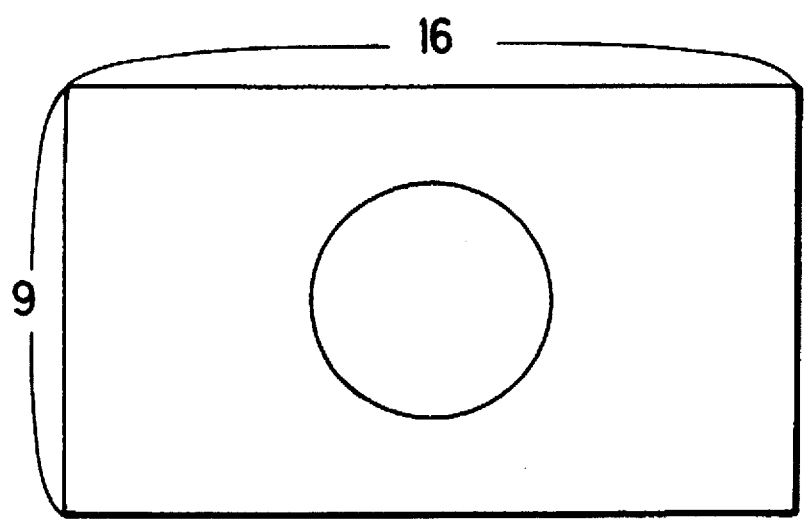
FIGS. 6A and 6B are drawings for explaining a squeezing method.

When the video signal supplied to the video encoding unit 52 is what a movie is converted into the video signal, its aspect ratio is oblong as shown in FIG. 6A for example. Some recent TV receivers have a screen having an aspect ratio of 16:9 as typified by a so-called high definition television receiver and such TV receiver having such aspect ratio can display pictures having the aspect ratio of movie on its screen as it is.

Figure 6B:
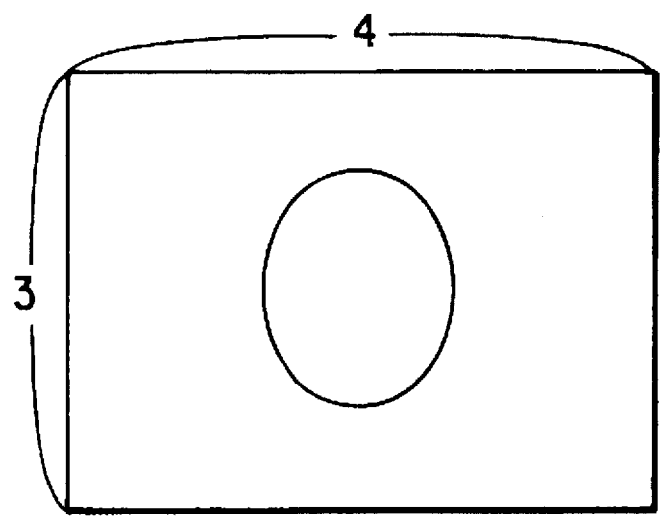

Contrary to that, the aspect ratio of screen of the conventional NTSC scheme is defined to be 4:3 as shown in FIG. 6B. Although the picture having the oblong aspect ratio can be viewed by the screen having the aspect ratio of the normal NTSC scheme by converting the aspect ratio into 4:3, the picture becomes longitudinal by doing so, as shown in FIG. 6B.

However, the TV receiver having the oblong aspect ratio allows to view the picture having the correct ratio as shown in FIG. 6A by returning the video signal converted into the aspect ratio of 4:3 into the original aspect ratio. Many of the receivers having the oblong aspect ratio contain a converter for returning a video signal converted into the aspect ratio of 4:3 by a squeezing method thus into the original aspect ratio. Then, when a picture having the oblong aspect ratio is input, the video encoding unit 52 is adapted to encode it by converting into the aspect ratio of 4:3 by the squeezing method as shown in FIG. 6B.

When the aspect ratio of the picture is thus converted by the squeezing method, a subtitle having the oblong aspect ratio also have to be converted by the squeezing method. The processing circuit 63 performs such a function.

Figure 7:
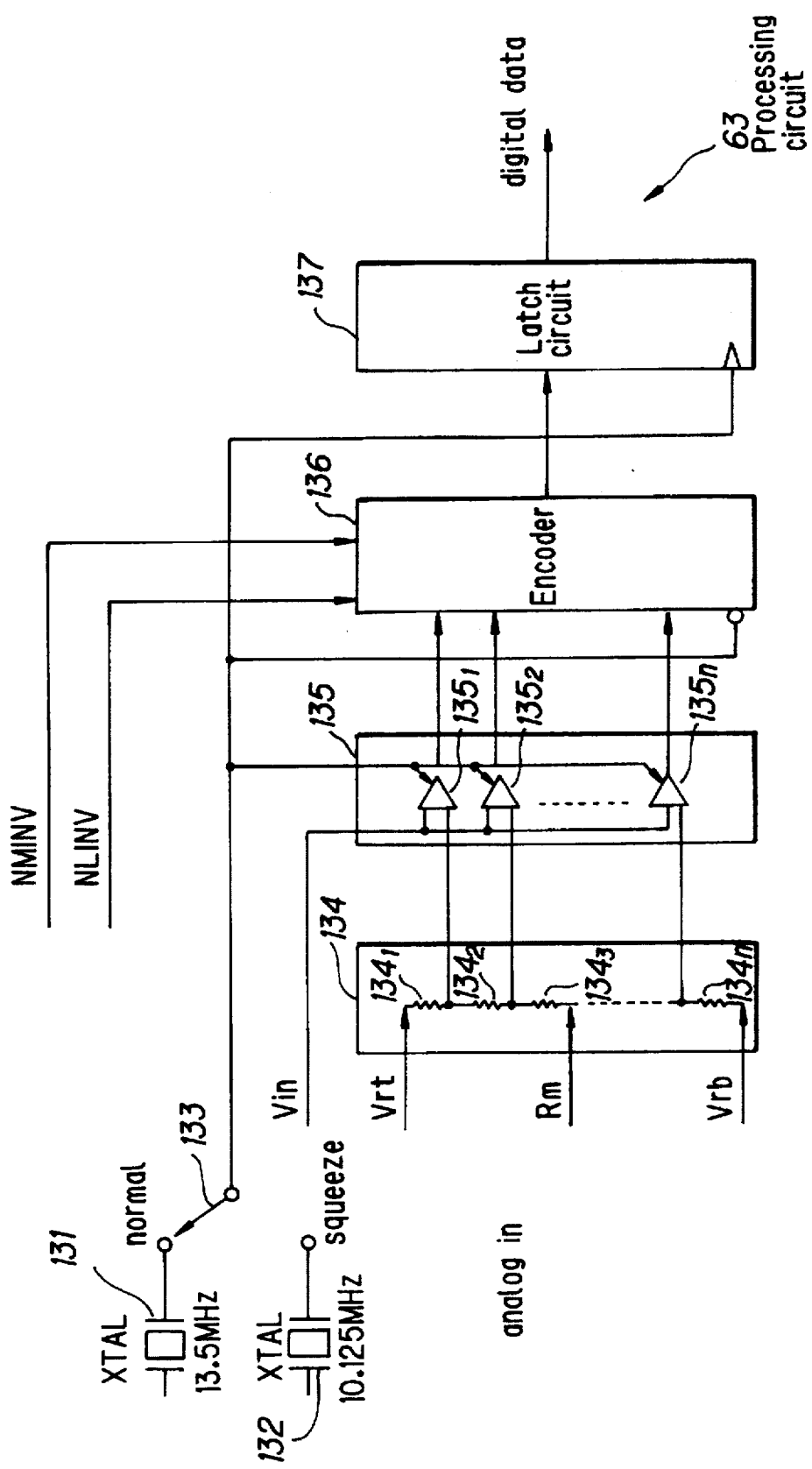
FIG. 7 is a block diagram showing a detailed arrangement of a processing circuit of the present invention.

FIG. 7 shows an exemplary construction of the processing circuit 63. The flying spot scanner 56 supplies an analog subtitle signal Vin which corresponds to the video image input to the video encoding unit 52 to a comparison circuit 135 in the processing circuit 63. The comparison circuit 135 is also supplied with reference voltages output by a voltage dividing circuit 134 having n resistances 1341 through 134n.

The comparison circuit 135 has n comparators 1351 through 135n to Which each reference voltage output by the voltage dividing circuit 134 is supplied and compares the subtitle signal supplied from the flying spot scanner 56 with each reference value. The comparators 1351 through 135n output a logical H signal for example when the subtitle signal is larger than the reference value and output a logical L signal when the reference value is larger.

An encoder 136 monitors the outputs of the comparators 1351 through 135n and decodes into signals of m bits satisfying n=2 m for n levels. Whether the value of 0 after the quantization is made to correspond with the maximum Value or minimum value output by the comparison circuit 135 is specified by input signals NMINV and NLINV. A latch circuit 137 latches the m bit data output by the encoder 136 and outputs it to the quantization circuit 64 via a contact (c) of a switch 10.

The comparison circuit 135, encoder 136 and latch circuit 137 are supplied with clocks output by an oscillation circuit 131 or 132 via a switch 133. Frequency of the clock output by the oscillation circuit 131 is 13.5 MHz and that output by the oscillation circuit 132 is 10.125 MHz. That is, the ratio of the both is set to be 4:3.

When the video signal processed in the video encoding unit 52 is that of the NTSC scheme having the normal aspect ratio of 4:3, the switch 133 is switched upward (to normal) in the figure to output the clock output by the oscillation circuit 131. Contrary to that, when the video encoding unit 52 encodes a video signal by the squeezing method, the switch 133 is switched downward (to squeeze) in the figure to output the clock output by the oscillation circuit 132. The frequency of the clock at this time is 10.125 MHz which is ¾ of the frequency of the normal case, so that the subtitle signal input to the comparison circuit 135 is also processed by the squeezing method.

On the other hand, because the subtitle data and key data supplied from the character generator 55 are digital data, they are converted from the normal data to squeezed data by the digital filter circuit 72 to be sent to the quantization circuit 64 via the contact (b) of the switch 62.

The subtitle data quantized by the quantization circuit 64 (hereinafter, the subtitle data (fill data) in a narrow sense and the key data are combined and referred to as the subtitle data in a wide sense) is input to a DPCM circuit 65 via a switch 69 for alternately selecting the output of the quantization circuit 64 or a color quantization circuit 70 to be DPCM-ed (Differentially Pulse Code Modulated). The output of the DPCM circuit 65 is supplied to a run length coding circuit 66. The run length coding circuit 66 encodes the input DPCM subtitle data into a data pair of level data and run data. A variable length encoding circuit 67 executes a variable length encoding process on the run supplied from the run length coding circuit 66 in accordance to variable length encoding data stored in a look up table in memory. This encoding data is shown in FIG. 8. A packing circuit 68 combines the variable length encoded data and level.

When the output of the run length coding circuit 66 is data of 1, 3, 3, 5, 5, 5, . . . for example, combined output data of the packing circuit 68 becomes as follows:

0001100110000010 1000010. . .

The first four bits of data 0001 represents that the first data (level) is 1. The next four bit data 0011 represents that the next data (level) is 3. Because the following data (level) is also 3, the run in this case is 1. Then, in addition to a four bit data 0000 which represents a start of zero run, a VLC code 0 for the case when the run length is 1 is added. Because the next data (level) is 5, four bit data 0101 is disposed and because two 5s continue following to that, the run length is 2 and its VLC code is 10. Then, this VLC code 10 is disposed next to a start code of run 0000.

When the run length exceeds a predetermined number (27 in the case of the present embodiment), the data amount may be reduced by fixing the length of the VLC code. When the run length exceeds 27, the VLC code is fixed to 10 bits in the present embodiment. When the fixed length VLC code is used, an escape (ESC) code 11111 for indicating that it is a fixed length Code is inserted just before the VLC code. A VLC code 1111111 indicating the end is also disposed in the end of one line.

The data variable length coded by the variable length coding circuit 67 as described above is packed with the level value extracted from the run length coding circuit 66 in the packing circuit 68.

Incidentally, the packing circuit 68 adds (multiplexes) a time code (PTSS described later), position information (disp start pos and disp end pos, described later), EOP and subtitle encoding information (subtitle header described later, all of them will be described later in detail) to the subtitle data and packets and outputs them to the multiplexer 58.

The packing circuit 68 computes a generated amount of the subtitle data at constant intervals and supplies its computed result to the rate controller 52a of the video encoding unit 52. Since the rate controller 52a can recognize a bit amount of the first pass of the video coding in the processing of the first pass and when it can recognize the data amount of the subtitle data from the signal from the packing circuit 68, it sets a bit rate in the video encoding unit 52 so that it becomes a variable rate fully utilizing the capacity of the channel or the recording medium such as the disk 91.

On the other hand, when the subtitle data encoded as described above is colored, i.e. chromatic color subtitle data (fill data) is superimposed on the video image, a color rectangular area (frame) surrounding the subtitle data (fill data) is produced by a bar manipulating section 81, telop coloring adapter 82, switcher 83 and monitor 84, as follows. That is, the subtitle data and key data generated by the character generator 55 are supplied to the monitor 84 via the switcher 83 and thereby the subtitle is displayed on the monitor 84. Then, the bar manipulating section 81 is controlled so as to specify the frame surrounding a portion to be colored in the subtitle displayed on the monitor 84.

A manipulation signal corresponding to the manipulation of the bar manipulating section 81 is output from the manipulating section 81 to the adapter 82. A rectangular area (frame) composed of R, G and B data for example as data of predetermined color is generated in the adapter 82 and the position and length of the frame may be changed corresponding to the manipulation signal from the bar manipulating section 81. By the way, the color of the frame produced in the adapter 82 may be changed by manipulating a color specification manipulating section (not shown).

The frame composed of R, G and B data generated in the adapter 82 is output to the switcher 83. The frame composed of R, G and B data is overlapped with the subtitle data and key data from the character generator 55 in the switcher 83 and is output to the monitor 84 to be displayed.

Accordingly, the user may color the subtitle by manipulating the bar manipulating section 81 and color specification manipulating section so that the frame of a desired color overlaps with a desired portion of the subtitle while confirming the display on the monitor 84.

In concrete, when a subtitle "A" is to be colored red, the bar manipulating section 81 is manipulated so that the red frame overlaps with a range surrounding the subtitle "A". When both of succeeding "A" and "B" among subtitles "ABCDE" are to be colored red, the bar manipulating section 81 is manipulated so that the red frame overlaps with the range surrounding the subtitles "A" and "B".

When a fixing button (not shown) is manipulated after overlapping the frame of the desired color with the desired portion of the subtitle as described above, the frame composed of the R, G and B data generated in the adapter 82 is supplied to the color quantization circuit 70 in the subtitle encoding unit 57. Incidentally, the adapter 82 contains a filter constructed similarly to the digital filter circuit 72 and outputs the frame by squeezing it, as necessary.

In the color quantization circuit 70, the frame composed of the R, G and B data from the adapter 82 is color quantized by making reference to stored values in a color lookup table (CLUT) 71. That is, the color quantization circuit 70 detects a stored value which is closest to the color of the frame composed of the R, G and B data from the adapter 82 among the stored values in the CLUT 71 at first.

In the CLUT 71, brightness data Y and color difference data Cb and Cr composed of eight bits for example are stored at respective addresses represented by four bits for example. That is, brightness data Y and color difference data Cb and Cr of 16 (=2$^4$) colors are stored in maximum.

Accordingly, the brightness data Y and color difference data Cb and Cr of a color which is closest to the color of the frame composed of the R, G and B data from the adapter 82 is detected among the colors stored in the CLUT 71 by the color quantization circuit 70.

When the brightness data Y and color difference data Cb and Cr are detected, each dot of the frame is converted into four bit address in the CLUT 71 in which its brightness data Y and color difference data Cb and Cr are stored.

Then, this four bit address is supplied to the DPCM circuit 65 via a switch 69, processed in the same manner with the subtitle data described above and output to the multiplexer 58 as color data (color information).

Because one frame is represented by the same address at this time; it may be represented by several bytes (e.g., 2 or 3 bytes per line) even if the frame is a large area by run length coding by the run length coding circuit 66. That is, the subtitle may be colored with less information amount.

By the way, when there is no color which is close to the color of the frame from the adapter 82 among the colors stored in the CLUT 71, the stored value in the CLUT 71 may be changed (updated) to one close to the color of the frame.

In this case, the stored value in the CLUT 71 after the change is transmitted to the packing circuit 68 in order to update stored values in a color lookup table (CLUT) 32 (FIG. 11) described later which is constructed in the same manner with the CLUT 71 and is included as part of a header of a packet of the subtitle data or color data (as described later in detail).

Data in services utilizing the blanking area (flyback period) such as character broadcasting and tele-text is also supplied to the subtitle encoding unit 57 in the same manner, processed similarly with the case described above and encoded and transmitted independently from the video data within the effective scan period.

Figure 9:
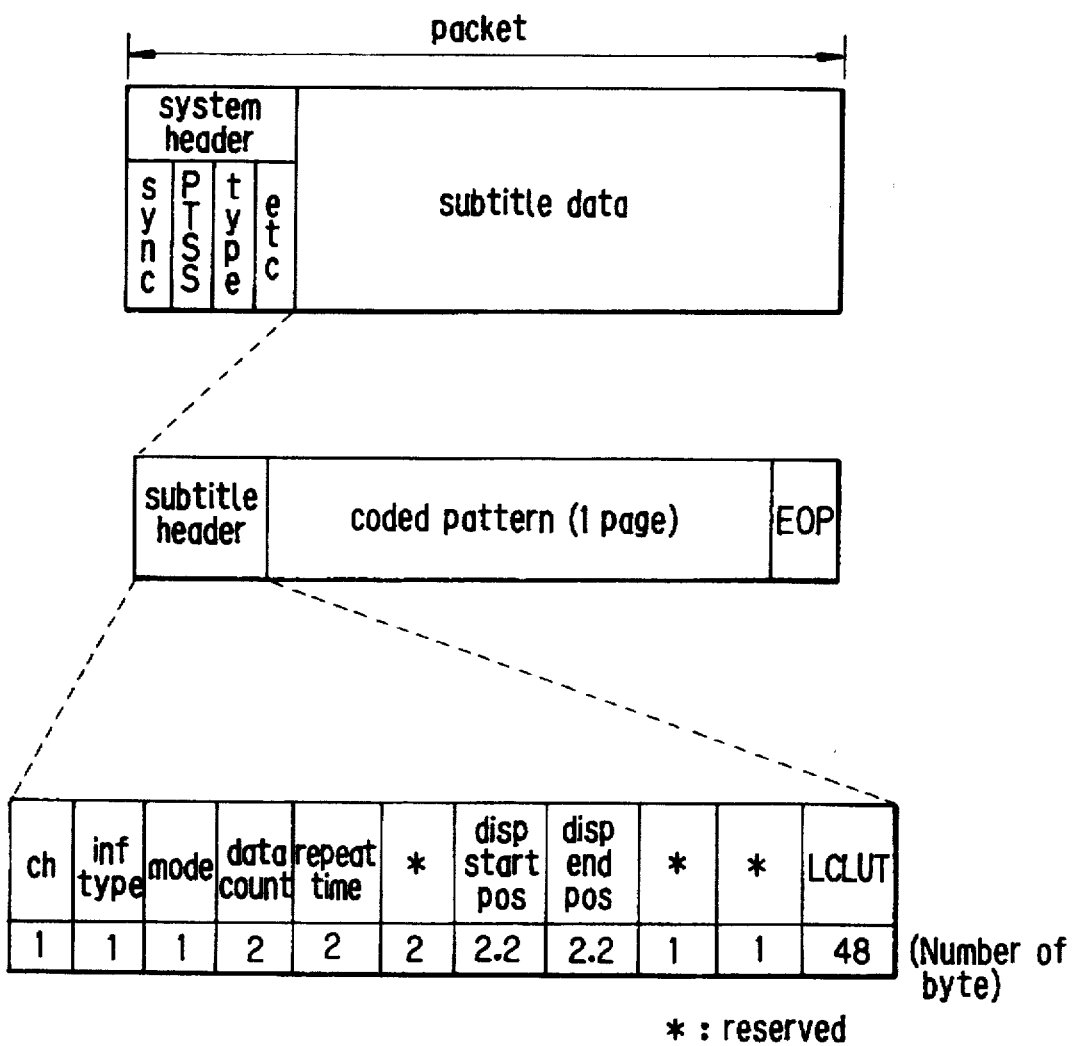
FIG. 9 is a diagram showing an encoded data format.

Referring now to FIG. 9, a packet format of the packeted data output from each of the subtitle encoding unit 57, video encoding unit 52 and audio encoding unit 54 will be explained. One packet is composed of a system header and data (such as subtitle data, color data, video signal and audio signal) disposed after that.

The system header is composed of a synchronous signal (sync) for system synchronization in a decoding unit described later (FIG. 10), PTSS (time stamp of subtitle display time when data is subtitle data or color data) type indicating a type of data (type: indicating that data is either one among data concerning on a subtitle such as subtitle data or color data, video signal or audio signal) and another necessary information (etc). When the data is subtitle data or color data, i.e. the subtitle data in the wide sense, it is composed of a subtitle header, a coded pattern as one page of subtitle data or color data and an EOP (page terminator such as a three byte code like FFFH). The EOP is adapted so as to byte-align the packet and subtitle data.

The subtitle header is composed of, from its head, one byte of channel (ch), one byte of information type (inf type), one byte of mode (mode), two bytes of data count (data count), two bytes of repeat time (repeat time), two bytes of reservation area (indicated by * in the figure), four bytes of display start position (disp Start pos), four bytes of display end position (dis end pos), one byte of reservation area (*), one byte of reservation area (*) and 48 bytes of loading color lookup table (LCLUT).

One byte of the channel (ch) indicates that which language the subtitle data described in the coded pattern is and a four bit code allocated beforehand to the language is described in its low order four bits (0-th to third bit). By the way, its high order four bits (fourth to seventh bit) is a reserved area. One byte of the information type (inf type) indicates whether the coded pattern is subtitle data (or color data) or other blanking data and when the coded pattern is subtitle data (or color data), its low order one bit (0-th bit) is 0 and when it is another blanking data, its low order one bit is 1. By the way, its first to third bit is a reserved area.

This information type (inf type) also indicates a number of lines per frame, i.e., a video mode as a displaying method, when the coded pattern is displayed and a four bit code which corresponds to the video mode is described in its fourth to seventh bit for example as follows:

```
0000   Video mode 1 (NTSC)
0001   Video mode 2 (PAL/SECAM)
0010   Video mode 3 (HD 1125: High-definition television scheme with
       1,125 horizontal scan lines)
0011   Video mode 4 (HD 1125: High-definition television scheme with
       1,125 horizontal scan lines)
0100   Video mode 5 (ATV-1: ATV in interface scan scheme)
0101   Video mode 6 (ATV-2: ATV in non-interlace scan scheme)
```

Here, 0110, 0111 and 1 xxx (x: Don't care) are not used.

The one byte of mode (mode) indicates a decoding method of the coded pattern (subtitle data or color data) in a subtitle decoding unit in FIG. 11 described later. That is, its 0-th bit becomes 0 when the subtitle superimposed on the video image is composed of either the subtitle data or color data only (a case when the subtitle data is composed of only color data will be explained later) and becomes 1 when it is composed of both of the subtitle data and color data (a case when the subtitle is displayed with color). Its first bit is effective when the 0-th bit is 0, i.e., when the subtitle is composed of either the subtitle data or color data only and becomes 0 or 1 when the subtitle is composed of only the subtitle data or color data, respectively.

Its second bit becomes 1 when the stored values in the CLUT 32 (brightness data Y and color difference data Cb and Cr) in the subtitle decoding unit in FIG. 11 described later are changed and becomes 0 when they are not changed. That is, it becomes 1 only when the brightness data Y and color difference data Cb and Cr are output from the CLUT 71 (FIG. 1 ) to the packing circuit 68.

The third to fifth bit in the mode is a reserved area and in its Sixth and seventh bit, a code which corresponds to an (inverse) quantization table used in an inverse quantization process in an inverse quantization circuit (IQ) 26 in the subtitle decoding unit in FIG. 11 which is described later. That is, because the bit allocation to the subtitle data (fill data) may be made by any one of 1 to 4 bits as described above, such 2 bit code as follows which corresponds to the quantization table used in the quantization in the quantization circuit 64 based on the bit allocation is described:

00 quantization table 0 (bit allocation to subtitle data is 1 bit)

01 quantization table 1 (bit allocation to subtitle data is 2 bits)

10 quantization table 2 (bit allocation to subtitle data is 3 bits)

11 quantization table 3 (bit allocation to subtitle data is 4 bits)

Accordingly, when the bit allocation is made, the sixth and seventh bit of the mode become "10" as explained with reference to FIG. 3.

Two bytes of the data count (data count) indicates a data amount of the coded pattern and the data amount of the coded pattern is described in its low order 14 bits (zero-th to 13-th bit) in unit of byte. Incidentally, its high order two bits (14-th to 15-th bit) are reserved areas.

Two bytes of the repeat time (repeat time) indicates a repeat time of decoding of the coded pattern in the character decoding unit (FIG. 11 ) described later. The decoding repeat time is described in its low order eight bits (zero-th to seventh bit) with a number of frames (or fields).

Figure 11:
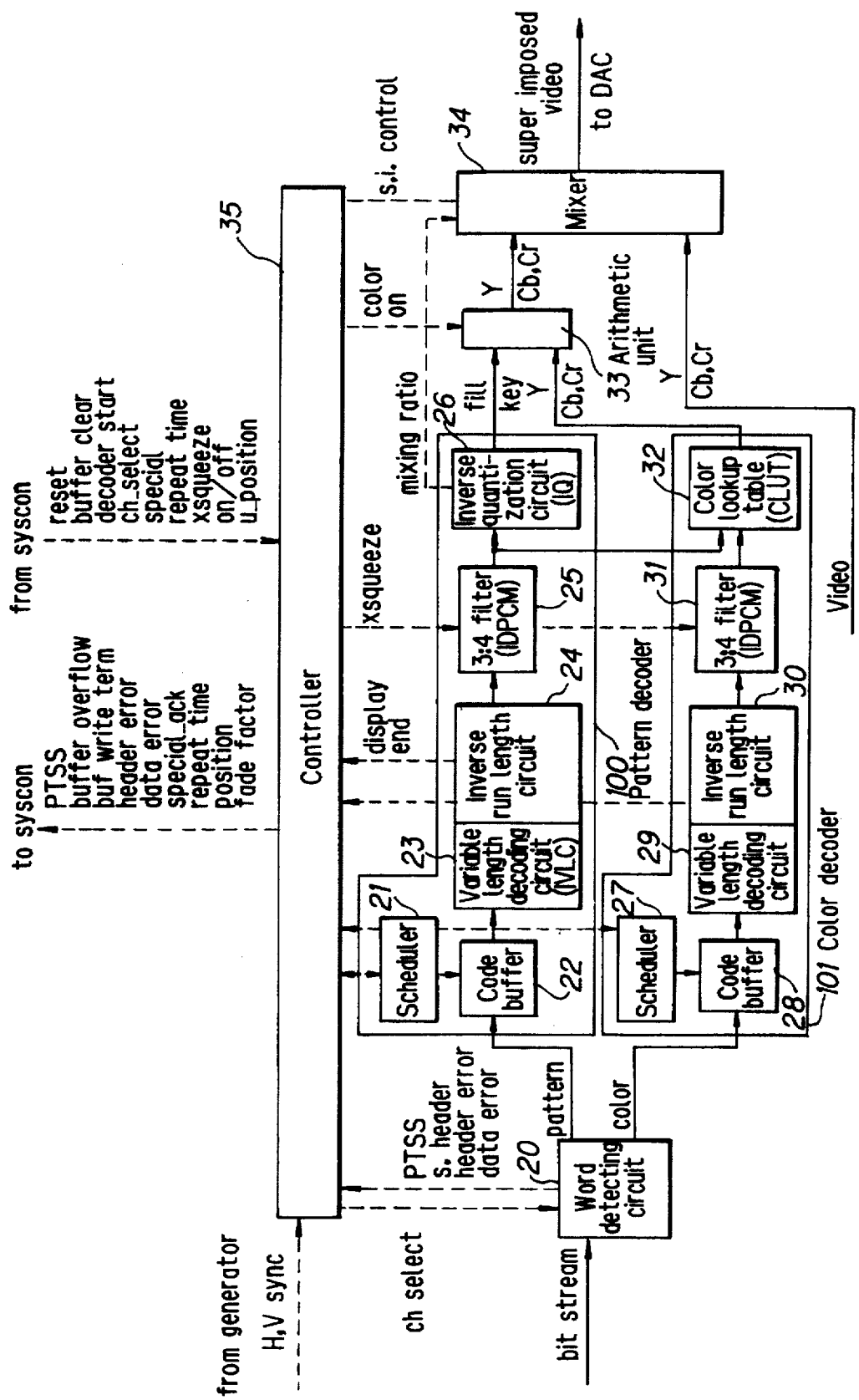
FIG. 11 is a block diagram showing a construction of a subtitle decoding unit of the present invention.

Accordingly, the code pattern is repeatedly decoded during a period of 256 (=28) frames in maximum in the character decoding unit in FIG. 11.

In concrete, when a certain subtitle as coded data is to be displayed superimposing on a video image during a period of 256 frames for example, the low order eight bits in the repeat time are described as "11111111". Incidentally, its high order eight bits (eighth to 14-th bit) are reserved areas.

Four bytes of the display start position (disp start pos) indicates a display starting position of the subtitle data or color data. x coordinate of the display starting position is described in its low order 16 bits (zero-th to 15th bit) with a number of pixels (number of pixels in horizontal direction) from, for example, the left end of a frame and y coordinate of the display starting position is described in its high order 16 bits (16th to 31st bit) with a number of horizontal scan lines (a number of lines in the vertical direction) from, for example, the upper end of the frame.

Four bytes of the display end position (disp end pos) indicates a display ending position of the subtitle data or color data. Similarly to the display start position described above, x coordinate of the display ending position is described in its low order 16 bits (zero-th to 15 bit) and y coordinate of the display ending position is described in its high order 16 bits (16th to 31st bit), respectively.

In 48 bytes of the loading color lookup table (LCLUT), the brightness data Y and color difference data Cb and Cr composed of eight bits of respective 16 colors are described when the second bit of the mode described above is 1, i.e., only when the stored values (brightness data Y and color difference data Cb and Cr) in the CLUT 32 of the subtitle decoding unit in FIG. 11 described later are changed in the same manner with the stored values in the CLUT 71 because the stored values in the CLUT 71 described above have been changed (Incidentally, when the second bit of the mode is 0, the LCLUT is deleted from the subtitle header).

That is, in its zero-th to 23rd bit, brightness data Y and color difference data Cb and Cr stored in address 0000 in the CLUT 71 (FIG. 1) are described per every 8 bits instead of 8 bits each of brightness data Y and color difference data Cb and Cr as the color stored in address 0000 in the CLUT 32 (FIG. 11 ) for example. Further, in its 24th to 47th bit, brightness data Y and color difference data Cb and Cr stored in address 0001 in the CLUT 71 are described instead of the brightness data Y and color difference data Cb and Cr stored in address 0001 in the CLUT 32 (FIG. 11 ). After that, the brightness data Y and color difference data Cb and Cr of 16 colors stored in the CLUT 71 are described in up to the 383rd bit.

By the way, While the colors (brightness data Y and color difference data Cb and Cr) stored in the CLUT 32 (FIG. 11 ) are all rewritten by the LCLUT when the LCLUT is described as described above, only the brightness data Y and Color difference data Cb and Cr of a color desired to be changed may be rewritten. In this Case, an address at which the color desired to be changed is stored, brightness data Y and color difference data Cb and Cr of a color to be written to that address and a number of colors to be changed are written to the LCLUT.

Figure 10:
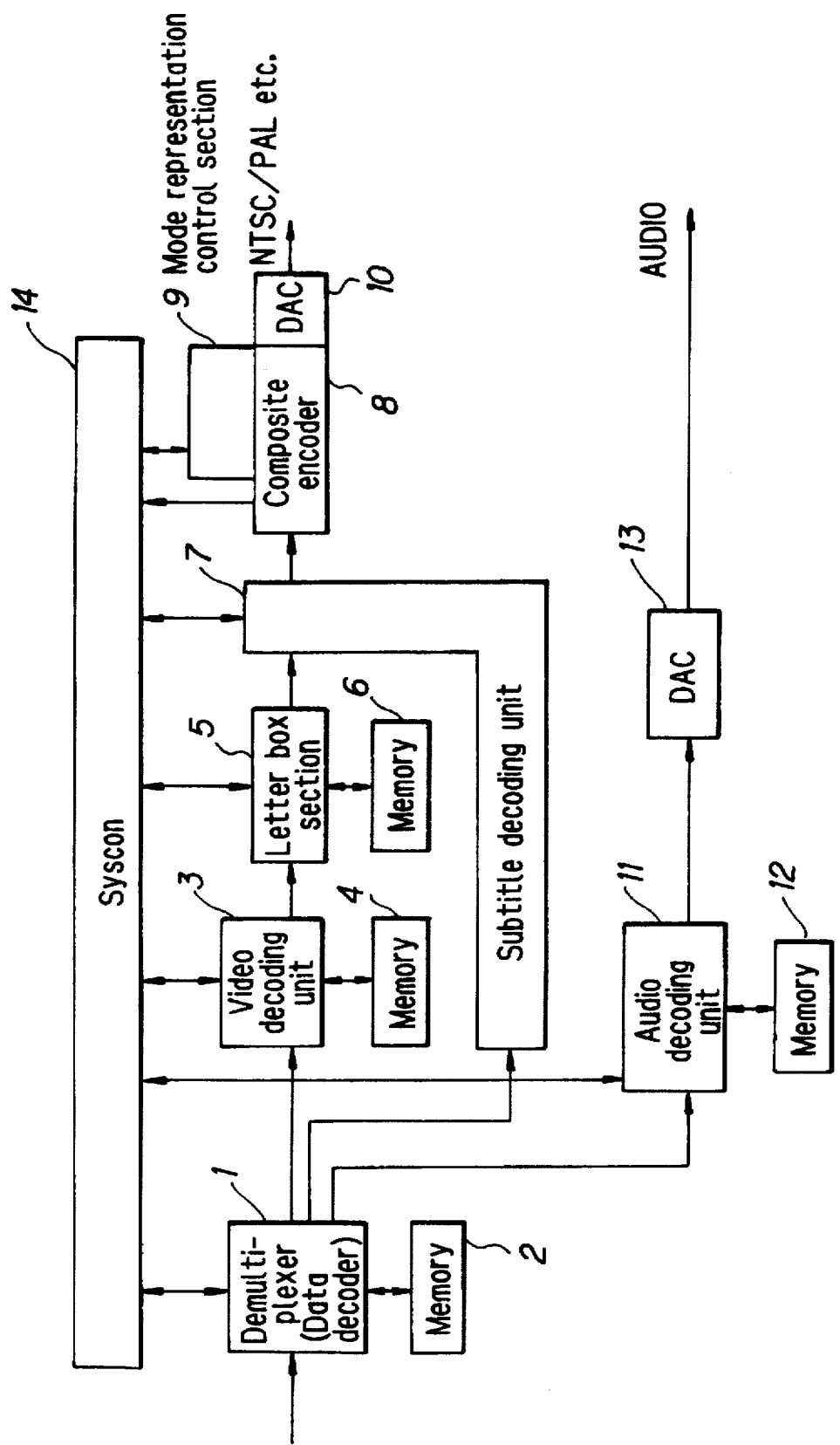
FIG. 10 is a block diagram showing a construction of one embodiment of a decoding unit to which the present invention is applied.

FIG. 10 shows a construction of one embodiment of a decoding unit for decoding the data in the aforementioned format transmitted from the channel or obtained by reproducing from a recording medium such as the disk 91 (FIG. 1 ) via a servo system. The data is input to a de-multiplexer 1 which functions also as a data decoder. In the de-multiplexer 1, a packet header is detected from the input data at first and the succeeding data is demodulated (channel decoded) while using a memory 2, as necessary (e.g., modulation such as EFM is released). Further, in the de-multiplexer 1, ECC is implemented and when an error is detected, an error detection signal (error) is output to a syscon 14.

The type in the packet header is referenced and the data is separated respectively to data related to subtitles (subtitle data and color data), video data and audio data. Then the data related to subtitles (subtitle data and color data), video data and audio data are output respectively to the subtitle decoding unit 7, video decoding unit 3 and audio decoding unit 11 together with strobe signals.

The subtitle decoding unit 7, video decoding unit 3 and audio decoding unit 11 receive the data output from the de-multiplexer 1 together with the strobe signals, i.e., the data related to subtitles, video data and audio data, respectively.

The video decoding unit 3 and audio decoding unit 11 use memories 4 and 12 as necessary to decode the video data and audio data, respectively. Incidentally, when an error correction signal or error detection signal is added to the video data or audio data, the video decoding unit 3 or the audio decoding unit 11 carries out such process as ECC or CRC check for example.

The decoded audio data is supplied to a DAC (digital-analog converter) 13 to undergo a D/A conversion process and to be converted into an analog audio signal. This analog signal is supplied to an audio output unit such as a speaker (not shown) to be output.

The decoded video data is input to a letter box section 5. The letter box section 5 carries out a process for thinning out (contracting) the vertical direction of the video data to ¾

(hereinafter referred to as the letter box process) by filtering for example when the video data is what converted into the aspect ratio of 4:3 by the squeezing method described above to be able to display the video image of 100% of circularity on the 4:3 monitor.

In the letter box section 5, the letter box process is carried out using a memory 6 for timing adjustment which can store at least ¼ (=1 ¾) field of video data. The letter box section 5 has a through path for outputting the video data as it is when the video data is not what converted into the aspect ratio of 4:3 by the squeezing method, i.e., one originally having the aspect ratio of 4:3.

On the other hand, the subtitle decoding unit 7 decodes the data related to subtitles supplied from the de-multiplexer 1, i.e., the subtitle data and color data. The decoded subtitle is superimposed on the video data output from the letter box section 5 and is supplied to a composite encoder 8. The video data on which the subtitle has been superimposed is converted into a signal of predetermined displaying scheme (e.g., NTSC, PAL and SECAM as well as HD1125, HD1250, ATV-1 and ATV-2 described above) by the composite encoder 8 and is supplied to a DAC (digital-analog converter) 10. The DAC 10 converts the video data into an analog signal. This analog signal is supplied to and displayed on a display such as a TV receiver (not shown).

The syscon 14 controls each block corresponding to information obtained from each block composing the decoding unit in FIG. 10 and to the manipulation, of the manipulating section (not shown). A mode display control section 9 controls and causes to display a command which corresponds to the manipulation of the manipulating section and other various information (e.g., the decoding unit is set so that a subtitle, is superimposed on the video image or so that which language is displayed as a subtitle) on a private display (not shown) or to superimpose them on the video data input to the composite encoder 8.

Referring now to FIG. 11, the subtitle decoding unit 7 will be explained in detail. At first, when a word detecting circuit 20 receives the strobe signal from the de-multiplexer 1 (FIG. 10), it also receives a bit stream in the packet form (FIG. 9) as data related to the subtitle (hereinafter referred to as the subtitle bit stream) output also from the de-multiplexer 1 (however, because the packet has been time-division multiplexed as described above, it may not be always consolidated in unit of packet).

The packet header and subtitle header (described as s. header in FIG. 11) are detected from the subtitle bit stream. Then, the PTSS in the packet header (FIG. 9) and necessary information among the information described in the subtitle header (s. header) (e.g., the repeat time, display restarting position (disp start pos) and display ending position (disp end pos)) are output to a controller 35 which controls each block composing the subtitle decoding unit 7 in synchronous with a timing of horizontal synchronous signals (H sync) or vertical synchronous signals (V sync) output from a clock generator (not shown). In FIG. 11, the display starting position (disp start pos) and display ending position (disp end pos) are both described as position.

The controller 35 is adapted to control each block composing the subtitle decoding unit 7 based on the information and others output from the word detecting circuit 20 under the control of the syscon 14 (FIG. 10).

The word detecting circuit 20 carries out CRC when a CRC, for example, is added as an error detection code in the packet header, subtitle data and succeeding coded pattern (FIG. 9) (subtitle data or color data), and when an error is detected as a result, outputs a header error or data error to the controller 35.

Further, the word detecting circuit 20 receives a channel select signal (ch_select) from the syscon 14 via the controller 35 to detect a channel which agrees with the channel select signal (ch_select) by making reference to a channel (ch)(FIG. 9) in the subtitle header detected from the subtitle bit stream.

Here, the channel select signal (ch_select) is a signal output from the syscon 14 through the manipulation made by the user and representing a channel of a subtitle language) to be superimposed on the video data.

Detecting the subtitle header having the channel (ch) which agrees with the channel select signal (ch_select) from the subtitle bit stream, the word detecting circuit 20 separates the byte-aligned subtitle data (FIG. 9) having the subtitle header from the subtitle bit stream and sends the remaining to the controller 35.

On the other hand, the subtitle data (in the narrow sense) separated from the subtitle bit stream is transferred to a pattern decoder 100 when its coded pattern (FIG). 9) is subtitle data (in the wide sense) and to a color decoder 101 when it is color data. By the way, the discrimination whether the coded pattern is the subtitle data or color data is made by making reference to the information type (inf type) and mode (mode) in the subtitle header (FIG. 9).

The pattern decoder 100 comprises a scheduler 21, code buffer 22, variable length decoding circuit (IVLC) 23, inverse run length circuit 24, 3:4 filter 25 and inverse quantization circuit (IQ) 26 and the color decoder 101 comprises a scheduler 27, code buffer 28, variable length decoding circuit (IVLC) 29, inverse run length circuit 30, 3:4 filter 31 and color lookup table (CLUT) 32. Incidentally, the schedulers 21 and 27, code buffers 22 and 28, variable length decoding circuits 23 and 29, inverse run length circuits 24 and 30 and 3:4 filters are similarly constructed and independently operated, respectively. Accordingly, the pattern decoder 100 and the color decoder 101 are similarly constructed except of the inverse quantization circuit 26 or the CLUT 32.

Then, the scheduler 21, code buffer 22, variable length decoding circuit (IVLC) 23, inverse run length circuit 24 and 3:4 filter 25 in the pattern decoder 100 will be explained here and explanation of the scheduler 27, code buffer 28, variable length decoding circuit (IVLC) 29, inverse run length circuit 30 and 3:4 filter 31 in the color decoder 101 will be omitted here. The subtitle data from the word detecting circuit 20 is transferred to and stored in the code buffer 22. The code buffer 22 is adapted to be able to maintain at least two 128 kbit/bank when it is constructed by an outside RAM for example. That is, it is constructed by at least two banks having capacity of 128 kbit. Data write and read operations are controlled by the scheduler 21 which generates write and read addresses.

The scheduler 21 outputs negative logic chip enable (xce), negative logic write enable (xre) or output enable (xoe) to code buffer 22 together with the write address or read address (address) for example and controls writing of data (data) from the word detecting circuit 20 or reading of data (data) to the variable length decoding circuit 23, respectively.

Figure 12:
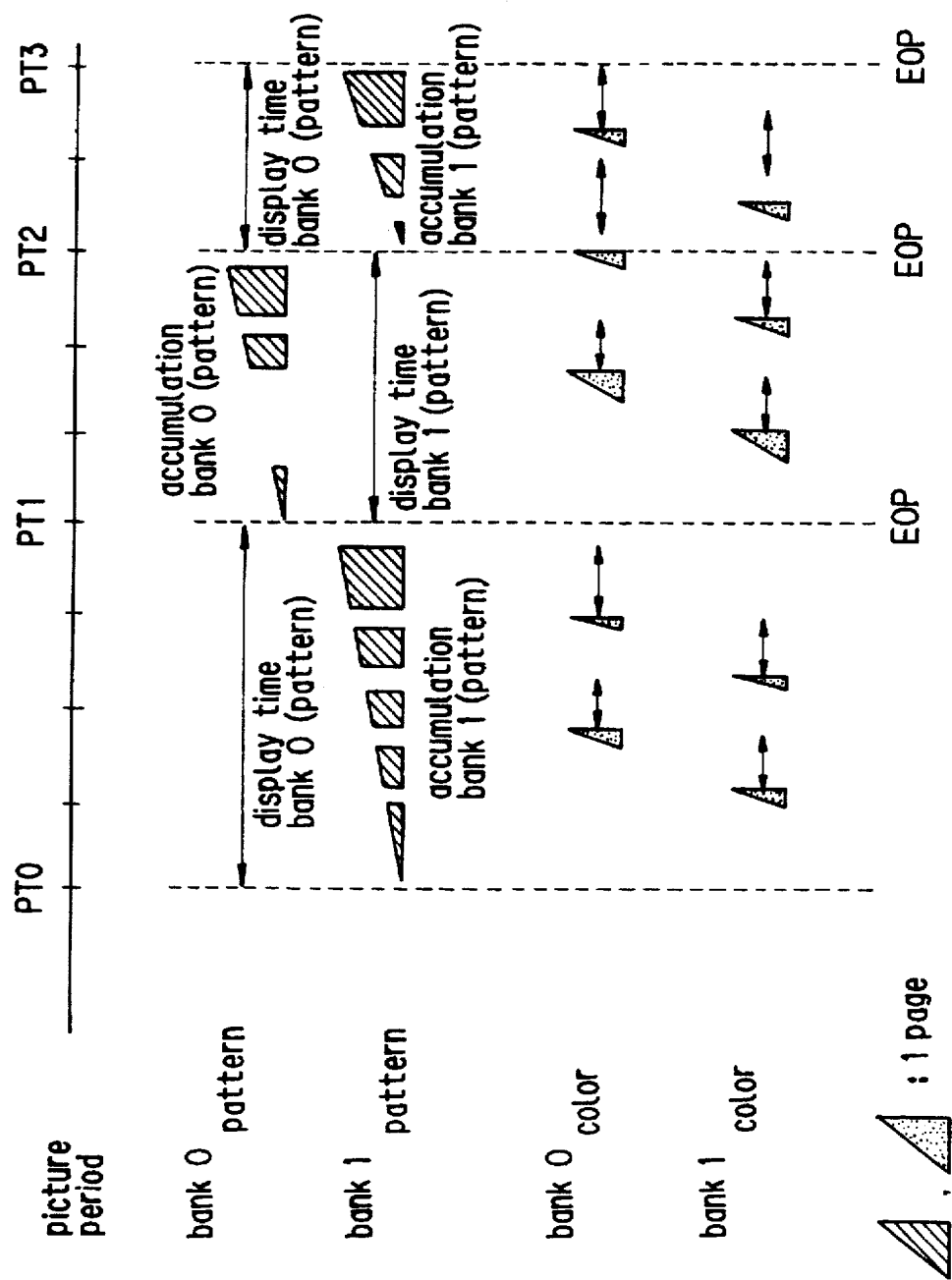
FIG. 12 is a diagram for explaining an operation of a code buffer 22 (and a code buffer 28) in FIG. 11.

Thereby,; When data is being written to one bank (e.g., a bank 1 ) in the code buffer 22,, data is read from another bank (e.g., a bank 0) and when data is being written to the bank 0 contrary to that, data is read from the bank 1, as shown in FIG. 12. The banks are changed over so as to be synchronized correctly in accordance to PTSS utilizing the EOP indicating the end of a page (FIG. 9). It allows to continuously process the data supplied from the word detecting circuit 20.

By the way, because the data input to the decoding unit in FIG. 10 has been time-divided as described above, one page of subtitle data output from the word detecting circuit 20 and written into the code buffer 22 (one hatched triangle in FIG. 12) is time-divided as shown in FIG. 12 so long as its data amount is not considerably small. On the Other hand, because data amount of one page of color data output from the word detecting circuit 20 and written into the code buffer 28 (one shaded triangle in FIG. 12) is considerably small as described above, it is included in one time-divided timing.

The reading of the byte-aligned subtitle data in unit of frame from the code buffer 22 is carried out by a number of times which corresponds to the repeat time (repeat time) (a number of frames in which subtitle data is displayed) described in the subtitle header by taking a necessary delay time from the timing of the vertical synchronous signal after receiving a decoding start signal (decoder start) from the controller 35. Then, once the reading of the subtitle data from the code buffer 22 is carried out by a number of times corresponding to the repeat time (repeat time), the subtitle data is deleted from the code buffer 22.

Here the decoding start signal (decoder start) indicating a start of decoding is output from the controller 35 as follows. That is, when the PTSS (time stamp of subtitle displaying time) is output from the word detecting circuit 20 to the controller 35, the controller 35 transfers this PTSS to the syscon 14 (FIG. 10). When the PTSS and clock of the unit (clock of 13.5 MHz for example supplied from the clock generator) are synchronized, the syscon 14 outputs the decoding start signal (decoder start) to the controller 35 and the controller 35 transfers the signal to the scheduler 21 as it receives the signal.

The control of reading of data from the code buffer 22 by a number of times corresponding to the repeat time (repeat time) is carried out by the controller 35 as follows. That is, when the repeat time (repeat time) in the subtitle header (FIG. 9) is output from the word detecting circuit 20 to the controller 35 as described above, the controller 35 transfers the repeat time to the syscon 14 (FIG. 10). The syscon 14 outputs the repeat time to the controller 35 corresponding to the decoding timing of the subtitle data by making reference to the PTSS.

The syscon 14 also outputs the repeat time to the controller 35 and after that, outputs a decrement pulse (decrement_pulse) which decrements the repeat time (repeat time) by one to the controller 35 with a timing synchronized with the frame rate. Receiving the repeat time from the syscon 14, the controller 35 decrements its value by one by one with the timing of (decrement_pulse) output also from the syscon 14. When the value of the repeat time becomes zero, the controller 35 controls the scheduler 21 so as to delete the data which has been decoded (read) from the code buffer 22.

When a normal reproduction (one time speed reproduction) is specified through a manipulation of the manipulating section, a special signal (special) indicating the normal reproduction is supplied from the syscon 14 to the controller 35. In this case, the syscon 14 outputs the decrement pulse (decrement_pulse) to the controller 35 with the timing synchronized with the frame rate, as described above.

When a special reproduction such as a reproduction in n-time speed (n-time speed Ff/FR), slow reproduction, frame feeding and pose through the manipulation of the manipulating section, a special signal (special) indicating the special reproduction is supplied from the syscon 14 to the controller 35. In this case, the syscon 14 also outputs the decrement pulse to the controller 35 with a timing corresponding to the special reproduction.

That is, when the syscon 14 outputs a special signal (special) specifying a n-time speed FF/FR for example, it also outputs the decrement pulse with n times of rate synchronized with the frame rate. When the syscon 14 outputs a special signal (special) specifying a pose (0 time speed reproduction) for example, it will not output the decrement pulse. Accordingly, the same subtitle data is continuously read from the code buffer 22 in this case.

By the way, when the controller 35 receives the special signal from the syscon 14, it transmits an acknowledgment to that (special_ack) to the syscon 14.

When the data writing control to the bank of the code buffer 22 is terminated, the scheduler 21 outputs a writing terminate signal (buf write term) to the controller 35. The controller 35 outputs the writing terminate signal from the scheduler 21 to the syscon 14 and thereby, the syscon 14 can detect an abnormality in the data supplied to the code buffer 22. That is, when no data is supplied to the code buffer 22 or no EOP is detected for a long period of time by some reason, the writing terminate signal cannot be received during that period, thus allowing the syscon 14 to detect the abnormality.

A band width of access of the code buffer 22 controlled by the scheduler 21 is defined as follows for example. When the data rate of data output from the de-multiplexer 1 (FIG. 10 is 20 Mbps in maximum and an I/O port of the code buffer 22 is 8 bits, writing to the code buffer 22 is carried out with 2.5 (=20/8) MHz. Then, when the display rate is 13.5 MHz, data is compressed and reading of data from the code buffer 22 is to be carried out with more than 8.5 MHz from the construction of a variable length coding (decoding) table, a band width necessary in writing and reading data in the code buffer 22 is 11 (2.5 +8.5) MHz.

The subtitle data read from the code buffer 22 is supplied to the variable length decoding circuit 23. The variable length decoding circuit 23 variable length codes the data from the code buffer 22 by making reference to the variable length coding table (variable length decoding table) shown in FIG. 8. Thereby, the subtitle data is converted into sets of runs and levels and is supplied to the inverse run length circuit 24.

The inverse run length circuit 24 generates levels equal to the number of runs and outputs them to the 3:4filter 25. Here, the inverse run length circuit 24 detects the EOPs from the data output from the variable length decoding circuit 23 and outputs a display end (display end) flag to the controller 35 when the number of EOPs detected coincides with the repeat time (repeat time). Further, when the word detecting circuit 20 detects the EOP from the input subtitle bit stream, it informs that to the controller 35.

When the controller 35 receives a signal informing that the EOP of the next page (EOP of not the page currently decoded but of the next page because the code buffer 22 is composed of two banks) has been detected from the word detecting circuit 20 before receiving the display end flag from the inverse run length circuit 24, i.e., in such a timing that the next data is supplied to the bank before completing reading of data from either one of two banks of the code buffer 22 (or the code buffer 28) because transfer of the subtitle bit stream (subtitle data or color data) supplied from the de-multiplexer 1, the controller 35 supplies a buffer overflow (buffer overflow) signal to the syscon 14 Receiving the buffer overflow signal, the syscon 14 makes a control to stop the output of new data from the de-multiplexer 1.

When a TV receiver connected at the latter stage of the DAC 10 (FIG. 10) has a screen having an aspect ratio of 4:3

, the 3:4 filter 25 converts subtitle data squeezed in the horizontal direction as described above so that it is displayed with 100% of circularity by filtering by a 3:4 interpolation filter. In this case, when the Original 16:9 screen is composed of 720×480 pixels and hence the horizontal direction of the squeezed screen is composed of 540 (720×3/4) pixels, the controller 35 controls the scheduler 21 so that the reading of data from the code buffer 22 is started with a timing faster than that of the horizontal synchronous signal by 90 pixels.

By the way, the 3:4 filter 25 contains an IDPCM circuit and after converting data as described above, it implements IDPCM on the converted data and outputs it to the inverse quantization circuit 26.

When the TV receiver connected at the latter stage of the DAC 10 has a screen having an aspect ratio of 16:9, the 3:4 filter 25 implements only the IDPCM on the data from the inverse run length circuit 24 (hereinafter referred to as "bypassing the 3:4 filter 25") and outputs it to the inverse quantization circuit 26. Whether the 3:4 filter 25 should be bypassed or not is determined by a squeeze signal (xsqueeze) supplied from the controller 35. This squeeze signal is also supplied from the syscon 14 to the controller 35 through a manipulation of the manipulating section made by the user.

The inverse quantization circuit 26 converts the 4 bit subtitle data (in the wide sense) supplied from the 3:4 filter 25 and explained with reference to FIG. 3 into the subtitle data (fill data) (in the narrow sense) and the key data in a video band. This data is then supplied to an arithmetic unit 33. The key data is supplied also to a mixer 34 as a mixing ratio (mixing ratio) with the subtitle and video image.

By the way, although not shown, the controller 35 supplies a quantization (inverse quantization) table specifying signal to the inverse quantization circuit 26 by making reference to the mode (mode) in the subtitle header. The inverse quantization circuit 26 stores a plurality of (inverse) quantization tables and performs the inverse quantization process by using one which corresponds to the quantization (inverse quantization) table specifying signal from the controller 35.

On the other hand, the CLUT 32 is supplied with color data similarly processed with the subtitle data described above by the scheduler 27, code buffer 28, variable length decoding circuit 29, inverse run length circuit 30 and 3:4 filter 31.

As described above, the color data is a 4 bit address for outputting a frame of color of subtitle (color frame) from the CLUT 32 in which 8 bit brightness data Y and color difference data Cb and Cr of 16 colors are stored for example. Accordingly, a color frame stored in an address indicated by the color data and composed of 8 bit brightness data Y and color difference data Cb and Cr is output from the CLUT 32. This color frame is supplied to the arithmetic unit 33.

Here the CLUT 32 is constructed to be down loadable. That is, in the CLUT 32, corresponding to the mode (mode) described in the subtitle header, brightness data Y and color difference data Cb and Cr stored therein are changed to the brightness data Y and color difference data Cb and Cr described in the LCLUT of the aforementioned subtitle header. Further, when a system reset (reset) is supplied from the syscon 14 to the controller 35, the stored value in the CLUT 32 is reset to a default value in the controller 35. This system reset (reset) is supplied from the syscon 14 to the controller 35 right after when the power of the system is turned on. At the time when the power of the system is turned on, buffer clear for clearing the code buffer 28 (also the code buffer 22) is also supplied from the syscon 14 to the controller 35.

The arithmetic unit 33 multiplies the color frame (the brightness data Y among the brightness data Y and color difference data Cb and Cr composing the color frame) from the CLUT 32 and the subtitle data (fill data) from the inverse quantization circuit 26. That is, the color range is, so to speak, blanked out by the subtitle data (fill data), thereby producing the colored subtitle data. Because the color difference data Cb and Cr among the brightness data Y and color difference data Cb and Cr composing the color frame interlocks with the brightness data Y among them, they are not used in the operation in the arithmetic unit 33.

The brightness data Y and color difference data Cb and Cr of the colored subtitle data are supplied from the arithmetic unit 33 to the mixer 34.

By the way, when the mode (mode) in the subtitle header (FIG. 9) indicates that the subtitle data is not colored, i.e., the subtitle is composed of the subtitle data (fill data) and key data excepting color data, the operation of the color decoder 101 is stopped. In this case, the pattern decoder 100 operates as described above and the subtitle data (fill data) and key data obtained as a result are supplied to the mixer 34 bypassing the arithmetic unit 33.

Whether the data from the pattern decoder 100 should be output as it is or not is determined in the arithmetic unit 33 as follows. That is, the controller 35 makes reference to the mode (mode) in the subtitle header (FIG. 9) and when its first bit is "1" and the subtitle is composed of both subtitle data and color data, the controller 35 puts a color on signal (color on) into "ON" state and outputs it to the arithmetic unit 33. The arithmetic unit 33 performs the aforementioned operation only when the color on signal in "ON" state is supplied from the controller 35 and outputs input data as it is in other cases.

The mixer 34 is supplied with the video decoded output (the brightness data Y and color difference data Cb and Cr) of the video decoding unit 3 (FIG. 10) as the background image, beside the output (brightness data Y) of the arithmetic unit 33 as the subtitle via the letter box section 5. The mixer 34 superimposes the subtitle on the background image based on the key data as the mixing ratio.

That is, the mixer 34 mutes the brightness data Y of the background image or subtitle corresponding to the key data and outputs by adding them. Thereby, for the subtitle data, the smaller the value of the key data, the more the mixing ratio becomes (the smaller the mute factor is) and for the background image, the smaller the value of the key data, the smaller the mixing ratio becomes (the larger the mute factor is) as explained with reference to FIG. 3, and the background image and the subtitle are smoothly mixed and output.

By the way, the superimposition of the subtitle on the background image is carried out in the mixer 34 only when a superimpose on/off signal (on/off) supplied from the controller 35 is "ON" state (in FIG. 11, the superimpose on/off signal, position (position), user position (u_position) described later and fade factor (fade factor) are represented as s.i. control in combination): This "ON" state superimpose on/off signal is supplied from the syscon 14 to the controller 35 through a manipulation of the manipulating section made by the user.

When no subtitle is superimposed, the superimpose on/off signal in "OFF" state is supplied from the syscon 14 to the mixer 34 via the controller 35 through the manipulation of the manipulating section made by the user and in this case, the video decoded output of the video decoding unit 3 is output as it is from the mixer 34.

The mixer 34 is also supplied with the position (position), display starting position (disp start pos) and display ending position (dis end pos) from the controller 35 and superimpose the subtitle at a display position following to the position (position).

The mixer 34 is also supplied with an user position (u_position) indicating a display position via the mixer 34 and the controller 35 when the user specifies the subtitle display position by manipulating the manipulating section. Receiving the user position, the mixer 34 superimposes the subtitle at the display position indicated by the user position taking precedence to the display position indicated by the position.

Although not shown in FIG. 9, the subtitle header is adapted to allow to describe the fade factor (face factor) for specifying fade in/fade out speed of the subtitle in any one of the reserved areas, beside those described before. When the fade factor is described in the subtitle header, the mixer 34 fades in or fade or the subtitle with a speed corresponding to the fade factor.

Figure 13:
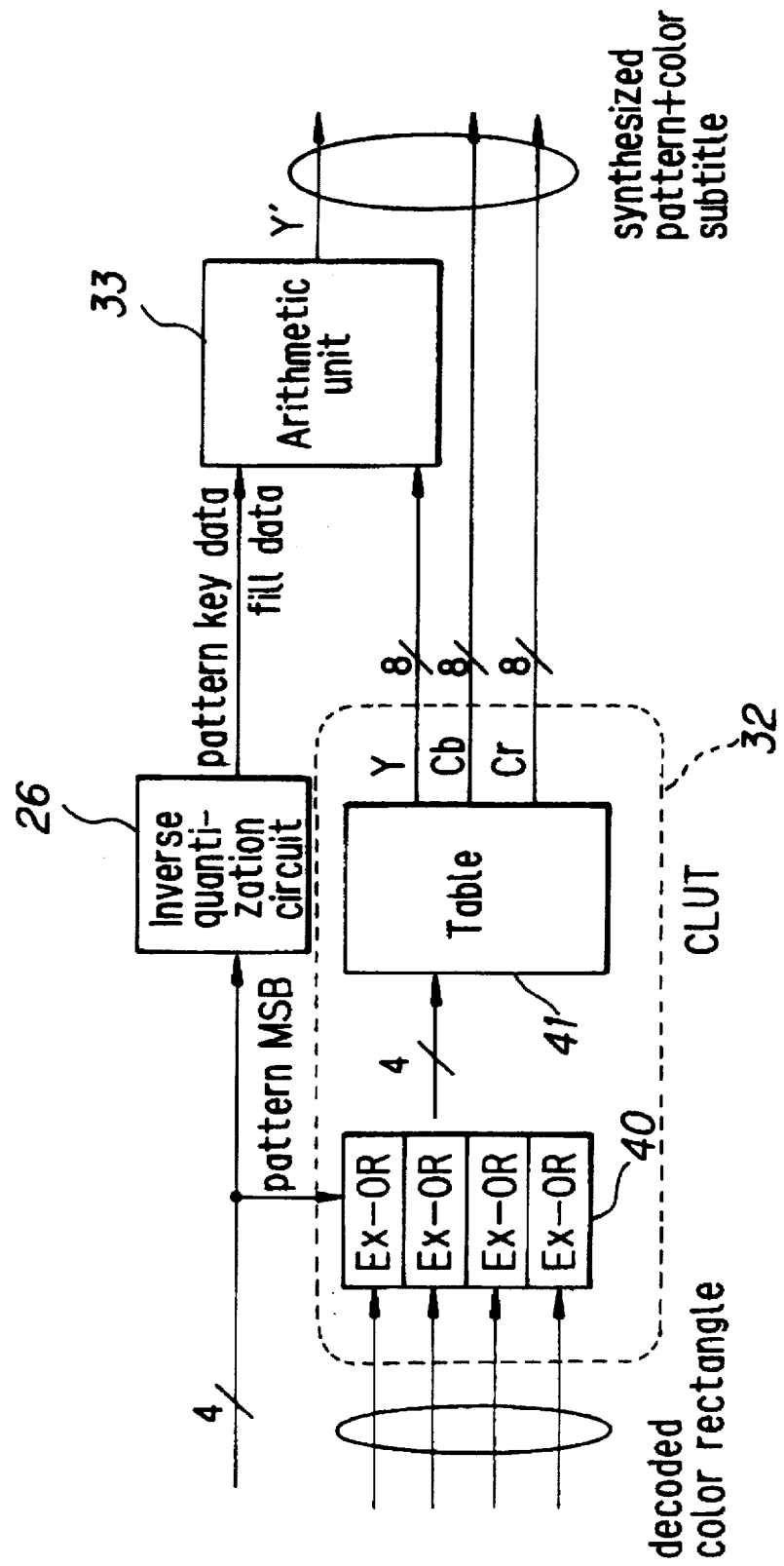
FIG. 13 is a diagram showing an exemplary construction of a color lockup table in FIG. 11.

By the way, the CLUT 32 may be adapted to receive the color data as well as the 4 bit subtitle data (subtitle data (fill data) and key data) input to the inverse quantization circuit 26 and be composed of EXOR circuit 40 and table 41 for example as shown in FIG. 13.

In this case, the color data as 4 bit address is input to the EXOR circuit 40. The EXOR circuit 40 is also supplied with MSB (it is 1 when the subtitle data in the wide sense is the subtitle data in the narrow sense, i.e., the fill data and 0 when it is the key data, as explained in FIG. 3), for example, among 4 bit subtitle data and calculates EXOR (Exclusive OR) of each of 4 bit color data and the MSB of 4 bit subtitle data.

Accordingly, the output of the EXOR circuit 40 will be different from the color data input to the EXOR circuit 40 in a timing when the subtitle data in the wide sense is the subtitle data in the narrow sense (fill data) and will be the very color data input to the EXOR circuit 40 in a timing when the subtitle data in the wide sense is the key data.

The output of the EXOR circuit 40 is supplied to the table 41. The table 41 stores 8 bit brightness data Y and color difference data Cb and Cr of 16 colors similarly to the case described above and receiving the output of the EXOR circuit 40 as an address, outputs the 8 bit brightness data Y and color difference data Cb and Cr stored at that address.

Considering now a case when no EXOR circuit 40 is provided, the output of the table 41 will be a color frame composed of the brightness data Y and color difference data Cb and Cr stored in a color data address and as shown in FIG. 14B, similarly to the case described above.

However, in the case shown in FIG. 13, the address output from the EXOR circuit 40 changes in the timing when the subtitle data in the wide sense is the subtitle data in the narrow sense (fill data) as described above. That is, the address output by the EXOR circuit 40 is switched depending on whether the MSB of the 4 bit subtitle data in the wide sense is 1 or 0. Due to that, the brightness data Y and color difference data Cb and Cr output from the table 21 also change in the timing of the subtitle data (fill data) and as a result, a color frame in which only a portion corresponding to the subtitle data (fill data) has a different color is output from the table 21.

That is, when the subtitle data (fill data is a character string "ABCDE" shown in FIG. 14A and the color data is an address for outputting from the table 21 a color frame surrounding the characters "A" and "B" and shown in FIG. 14B, a color frame as shown in FIG. 14C in which portions of the characters "A" and "B" have a different color (color composed of the brightness data Y and color difference data Cb and Cr stored at the address (color data) changed by taking EXOR with the subtitle data in the wide sense) from the color frame in FIG. 14B is output by changing the color data as the address, i.e., by blanking out the color frame by the timing of the subtitle data (fill data). Then, in this case, the output of the table 41 (FIG. 14C) is blanked out at first corresponding to the key data from the inverse quantization circuit 26 in the arithmetic unit 33 and thereby the output of the table 41 (FIG. 41 C) is turned into the subtitle (brightness data Y and color difference data Cb and Cr), as shown in FIG. 14D, in which the character frames having the original color of the color frame (color of the color frame in the case when the color data as the address for outputting the color frame from the table 41 ) is added to the subtitle data (fill data).

By the way, in this case, because the portion of the characters (fill) is what the color frame has been blanked out by the timing of the subtitle data (fill data) as described above, the brightness sharply changes at the border of the character frame and the character (fill) and hence the subtitle is not easy to be seen.

Then the arithmetic unit 33 multiplies the subtitle having the character frame with smoothly changing subtitle data (fill data) supplied from the inverse quantization circuit 26 and outputs the result to the mixer 34.

It smoothes out the changes of the brightness at the border of the character frame and the character (fill) and allows to output a subtitle with the character frame which is easy to be seen.

As described above, when the CLUT 32 is constructed as shown in FIG. 13, the character frame may be added to the subtitle without specifically requiring information on the character frame, i.e., with less information amount. Accordingly, when the present invention is applied to an equipment such as Karaoke set for dynamically changing colors of subtitle and its character frames timewise corresponding to a timing of a song, many more software (music melodies) may be recorded on a recording medium (e.g., CD). Further, when a Karaoke set is adapted to receive software (melodies) from a center via a telephone line for example, it can receive melodies with less information amount and thereby the communication cost can be reduced.

The method for adding the character frame to subtitle as described above may be applied to a case when a pattern of the subtitle is dynamically changed timewise like, when the subtitle is scrolled.

By the way, although the subtitle has been composed of only the subtitle data in the wide sense or of the subtitle data and the color data indicating a color frame in the embodiment described above, it may be composed of only the color data, beside that.

When the subtitle is composed of only color data, the color data as the address in the CLUT 32 is an address for outputting a color of a shape (pattern) of character in the subtitle (area of shape of character composed of brightness data Y and color difference data Cb and Cr) in the encoding unit in FIG. 1. Then, in this case, the operation of the pattern decoder 100 is stopped in the subtitle decoding unit 7 and the color data is decoded by the color decoder 101 as explained in FIG. 11.

Because the color data is represented by the same value (address) also in this case when the subtitle is displayed by one color, it can be accomplished with less information amount by implementing the run length coding. Accordingly, when the present invention is applied to an unit such as a reproduction unit of movie software which only displays colored subtitle (which does not require to dynamically change the subtitle timewise), only the pattern decoder 100 needs to be removed and hence the unit may be constructed with less cost.

Further, in this case, the color data may be arranged so that the character frame is added with an intermediate color between those of the subtitle and background video image. It allows to provide a subtitle which is easy to be seen. Further, in implementing the variable length coding (decoding), a variable length coding (decoding) table as shown in FIG. 15 for example may be used beside the one shown in FIG. 8.

Now a structural example of buses for exchanging the aforementioned signals between each block in the decoding unit in FIG. 10 will be briefly explained. At first, the syscon 14 (FIG. 10) and the controller 35 (FIG. 11) are connected by 8 bit data bus, 4 bit selection bus and 1 bit directional bus. The signals shown above the controller 35 in FIG. 11 are exchanged by the data bus. The directional bus becomes H or L level for example when data (signal) is transmitted from the syscon 14 to the controller 35 or when transmitted from the controller 35 to the syscon 14, respectively. The selection bus is used to discriminate nine types of signals including (reset) shown above the controller 35 in FIG. 11 transmitted from the syscon 14 to the controller 35 or nine types of signals including (PTSS) shown above the controller 35 in FIG. 11 transmitted from the controller 35 to the syscon 14 (the selection bus can discriminate 16 (=2⁴) types of signals because it is compose of 4 bits as described above).

Bit number of the signals shown in FIG. 11 (bit number of the buses for exchanging the signals) transmitted from the syscon 14 to the controller 35 is as follows, where a transmission frequency of each signal is shown in parentheses.

reset . . . 1 bit buffer clear . . . 1 bit (max. 30 Hz)

decode start . . . 1 bit (max. 30 Hz)

ch_select . . . 5 bits (static)

special . . . 1 bit (as it happens)

repeat time . . . 8 bits (as it happens)

xsqueeze . . . 1 bit (static)

on/off . . . 1 bit (static)

u_position . . . 1 bit (static)

Bit number of the signals shown in FIG. 11 transmitted from the controller 35 to the syscon 14 is shown as follows, where a transmission frequency of each signal is shown in parentheses.

buffer overflow . . . 1 bit (max. 30 Hz)

buf write term . . . 1 bit (max. 30 Hz)

header error . . . 1 bit (max. 30 Hz)

data error . . . 1 bit (max. 30 Hz)

special_ack . . . 1 bit (as it happens)

repeat . . . 8 bits (max. 30 Hz)

position . . . 8 bits (max. 30 Hz)

fade factor. . . 4 bits (max. 30 Hz)

Further, the horizontal synchronous signal (H sync), vertical synchronous signal (V sync) and 13.5 MHz clock supplied from the aforementioned clock generator to the controller 35 are supplied via a 1 bit bus. The data, strobe signal and error signal are output from 1 via the 8, 1 and 1 bit buses, respectively. The address (write address and read address), chip enable (xce), write enable (xre) and output enable (xoe) are output from the scheduler 21 to the code buffer 22 via the 15, 1, 1 and 1 bit buses, respectively, and data is output from the code buffer 22 via an 8 bit bus. The scheduler 27 and code buffer 28 are arranged in the same manner as above.

A video signal of 4:2:2 for example is output from the video decoding unit 3 (FIG. 10) via a 16 bit bus and the 4:2:2 video signal is input to the DAC 10 via the 16 bit bus.

Figure 16:
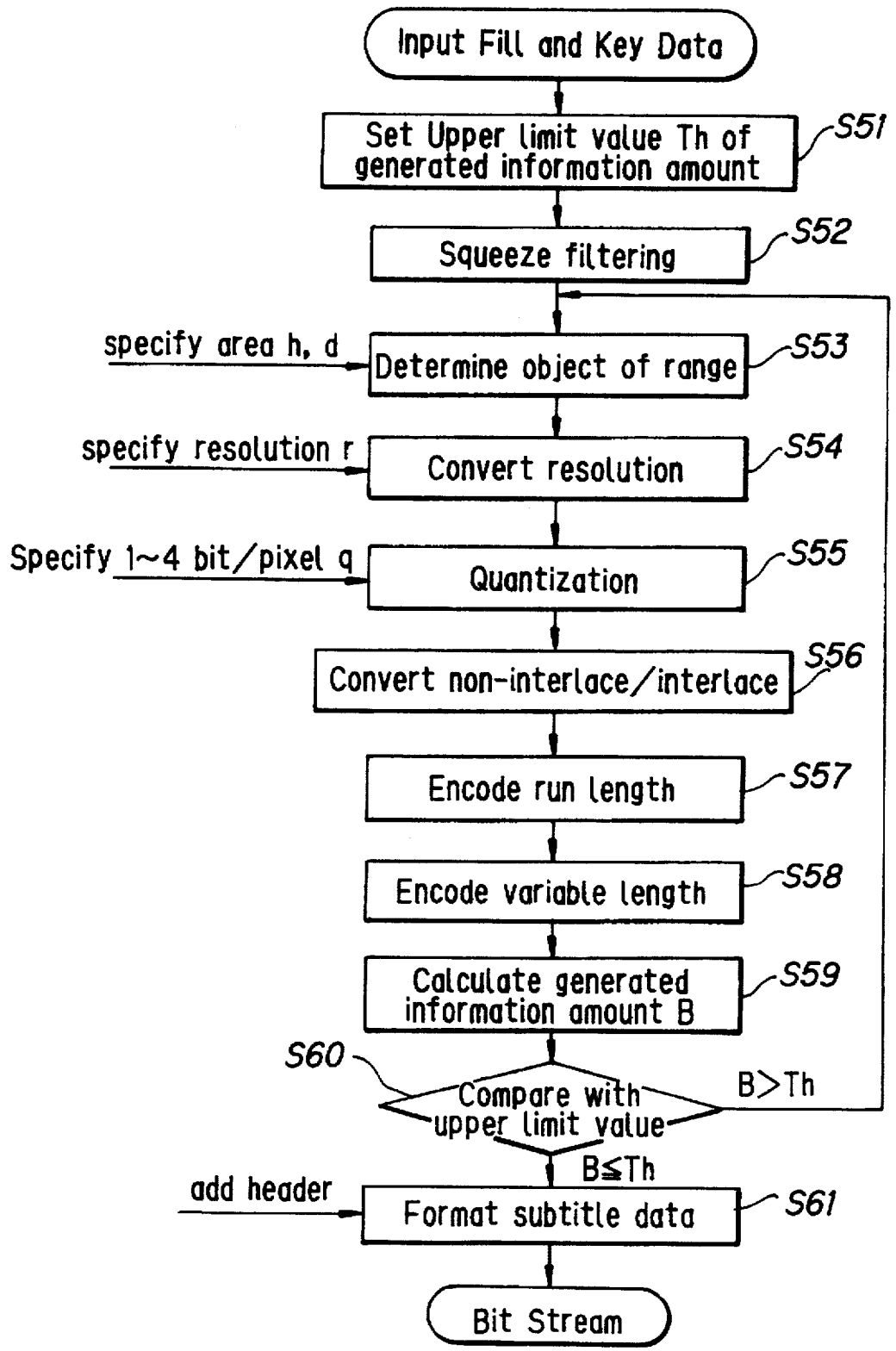
FIG. 16 is a flowchart for explaining the processing operation of the quantization circuit 64 in FIG. 1.

Referring now to a flowchart in FIG. 16, operations of the coding unit shown in FIG. 1 will be explained centered on a process for changing a subtitle displaying range. At first, in Step S51, an upper limit value Th of generated information amount (coded data amount variable length coded by the 67) in the packing circuit 68. This upper limit value Th is used as a criterion for determining whether a value of generated information amount is adequate or not.

Figure 17A:
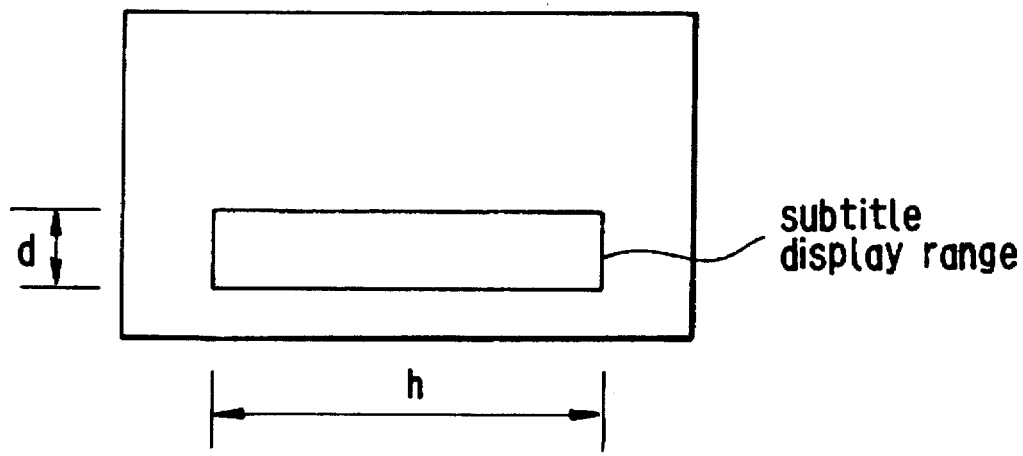
FIGS. 17A through 17C are drawings for explaining an example of the processing of the present invention.

In Step S52, a squeeze filtering is carried out by the digital filter circuit 72 and then the processes from Step S53 to S56 are carried out in the quantization circuit 64. In Step S53, a range in which subtitle is displayed is determined. This subtitle display range is determined by a length h in the horizontal direction and length (height) in the vertical direction on the screen as shown in FIG. 17A. These lengths h and d are input to the quantization circuit 64 by means of a personal computer composing the character generator 55. In Step S54, a resolution converting process is carried out. This resolution r is also specified and input by the computer composing the character generator 55.

Figure 18A:
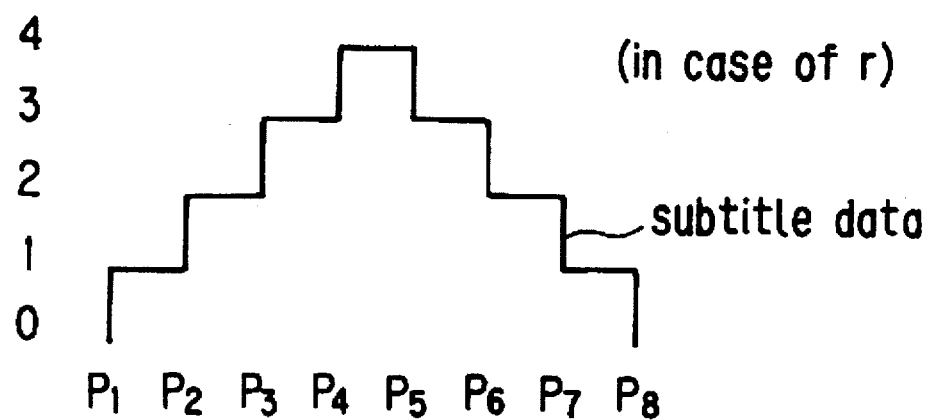
FIG. 18A and 18B are diagrams for explaining a horizontal resolution.
Figure 18B:
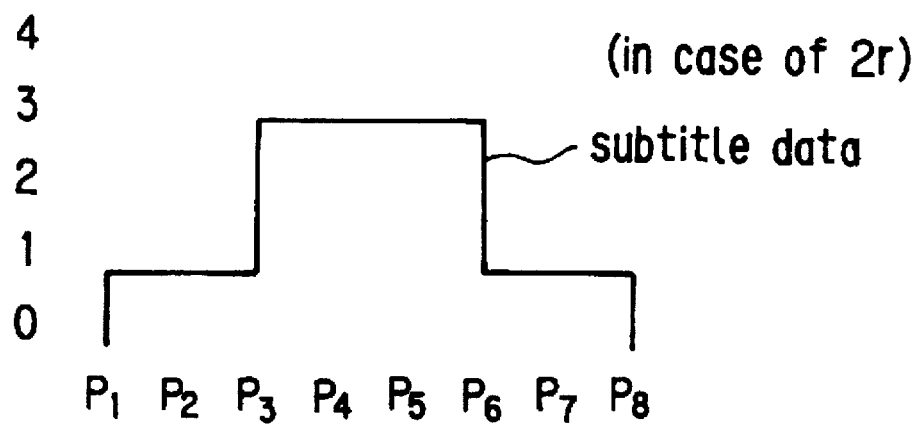

FIGS. 18A and 18B show a principle for specifying the horizontal resolution r. Now, if subtitle data is to be quantized per each pixel Pi as shown in FIG. 18A for example, the quantization is carried out per odd number pixel P2i+1 as shown in FIG. 18B for example to set its resolution in the horizontal direction to ½. Because a number of pixel to be quantized becomes half as compare to the case shown in FIG. 18A by doing so, a quantized data amount output from the quantization circuit 64 may be reduced. The quantization circuit 64 determines pixels to be quantized corresponding to the specified resolution r.

By the way, although the odd number pixel data has been sampled and held in FIG. 18B, even number pixels may be sampled and held. Or, average values of data of two pixels may be found and used. Furthermore, when it is desirable to reduce the number of pixels to ⅓, ¼, . . . , a value of,each pixel may be sampled and held one per three pixels or one per four pixels. The sample and hold of pixel data as described above is carried out corresponding to the specified resolution r in Step S54.

Figure 17B:
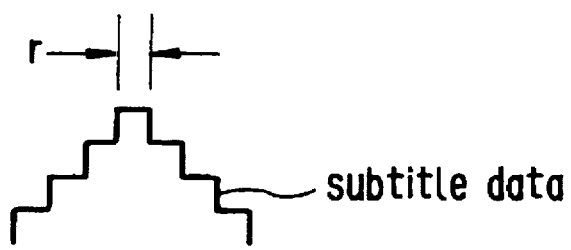

FIG. 17B diagrammatically shows a state in which the resolution r is specified.

Next, in Step S55, a quantization bit number q per pixel is determined. This value q is also specified and input from the personal computer as the character generator FIG. 17C conceptually shows a basic quantized data amount. That is, because data of each pixel in the display range of h×d is represented by the bit number q per each pixel, the whole data amount Q before coding is: Q=h×d×q.

However, this Q is just an indicator and does not indicate an actually coded data amount, though it indicates the data amount in the previous stage of coding, In Step S56, the quantization circuit 64 converts data in non-interlaced structure output by the personal computer as the character generator 55 into data in interlaced structure. This is Carried out to match with video signals processed in the video encoding unit 52 which is in the interlaced structure.

After completing the processes in the quantization circuit 64 as described above, the signal on which DPCM has been implemented in the DPCM circuit 65 undergoes the run length coding process in Step S57, as necessary. The run length coding process is carried out in the run length coding circuit 66.

In Step S58, the data coded into run length code in the run length coding circuit 66 is variable length coded in the 67. In Step S59, the 67 calculates a generated information amount B of data variable length coded in Step S58.

In Step S60, the generated information amount of the variable length coded data obtained in Step S59 is compared with the upper limit value Th set in Step S51 in the packing circuit 58. In the packing circuit 68, the process advances to Step S61 when the variable length coded data is equal or less than the upper limit value Th to carry out a formatting process of the subtitle data. Here a header containing predetermined data is added further as described above.

On the other hand, when it is determined that the variable length coded data is greater than the upper limit value Th, the process returns to Step S53 to repeat the processes thereafter.

That is, because the coded data obtained here is greater than the upper limit value Th, it must be restricted below the upper limit value Th. Then in Steps S53 through S55, at least one of the subtitle display range h and d, resolution r and quantization bit number per pixel q is set to a value different from the previous one so that the variable length coded data becomes less than the upper limit value Th.

Figure 17C:
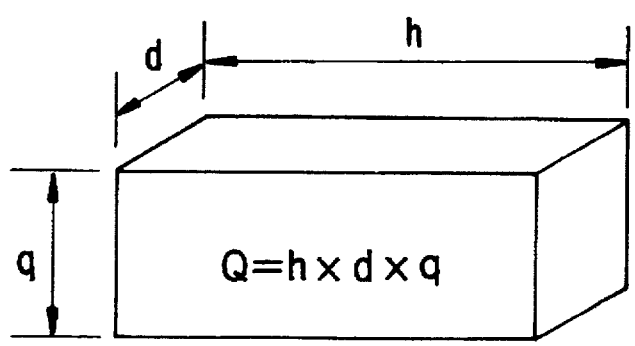
Figure 19A:
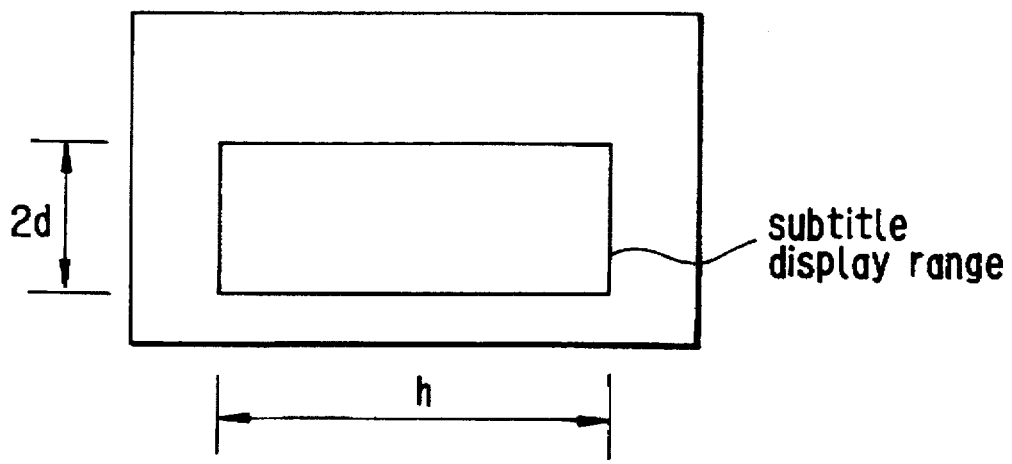
FIGS. 19A through 19C are drawings for explaining another example of the process of the present invention.

For example, when the length d in the vertical direction of the subtitle display range is doubled, as shown in FIG. 19A, as compare to the case shown in FIG. 17A, the basic data amount Q is also doubled from the case shown in FIG. 17C if the quantization bit number q per pixel is kept same with that in FIG. 17C. As a result, the variable length coded data output from the 67 is presumed to increase from the case shown in FIG. 17. Then, in such a case, the value of the quantization bit number q is set ½ of the case shown in FIG. 17 as shown in FIG. 19C. By doing so, the basic quantization amount Q may be kept same with the case in FIG. 17C.

While 256 levels of outputs have been classified into 8 levels in the process of the flowchart and in the embodiment in FIG. 5, the process of setting the quantization bit number q to half is equivalent to classifying the 256 levels into four levels.

Figure 19B:
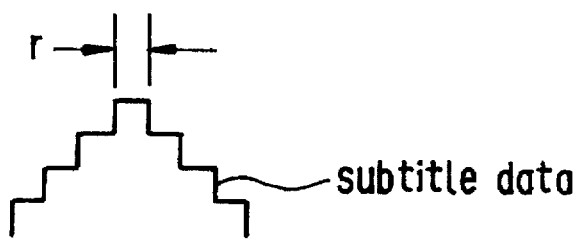
Figure 19C:
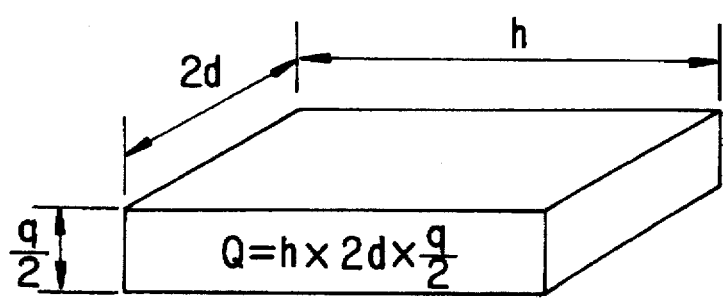
Figure 20A:
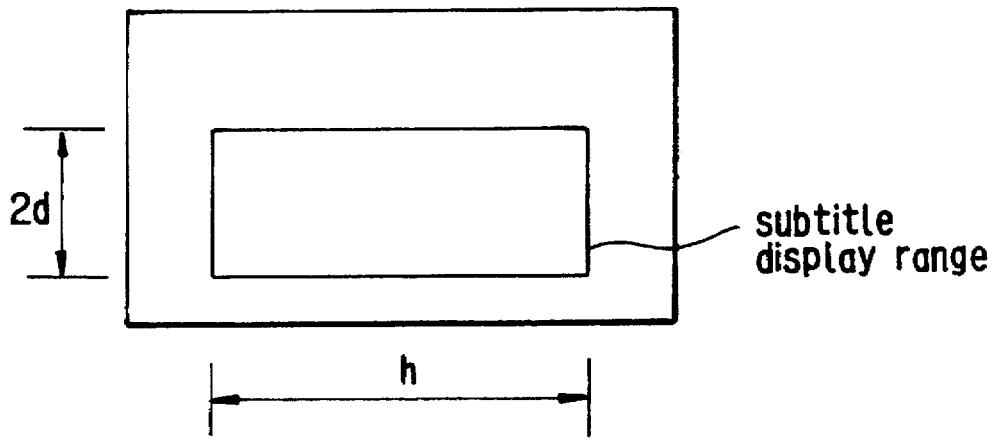
FIGS. 20A through 20C are drawings for explaining still another example of the processing in FIG. 16.
Figure 20B:
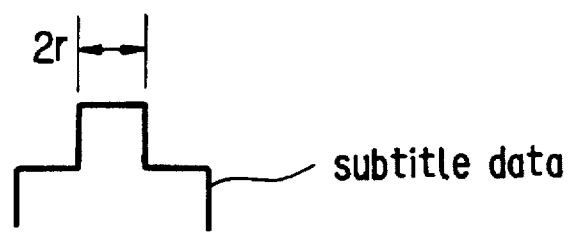
Figure 20C:
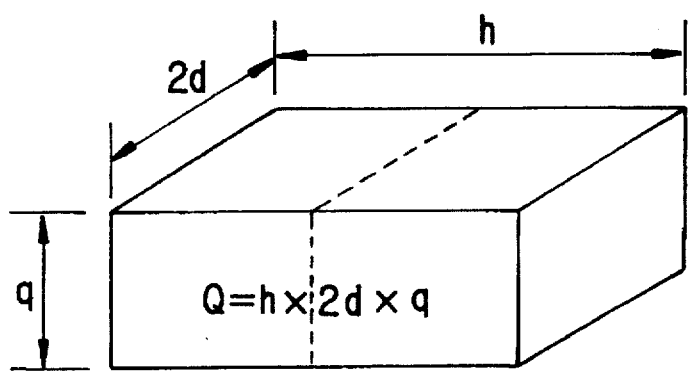

Or, when the length in the vertical direction of the subtitle display range is doubled to 2d from the case shown in FIG. 17A and when the value of the quantization bit number q is kept same with the case shown in FIG. 17C, a value of the horizontal resolution r may be set at 2r which is twice of the case shown in FIGS. 17B and 19B. By doing so, a number of generated pixels in the horizontal direction (h direction) becomes half as compare to the cases shown in FIGS. 17C and 19C, so that it is equivalent to the case when the length of h is cut substantially into half. Then the basic quantization amount Q may be kept same with those cases shown in FIGS. 17 and 19 also in this case.

Figure 21A:
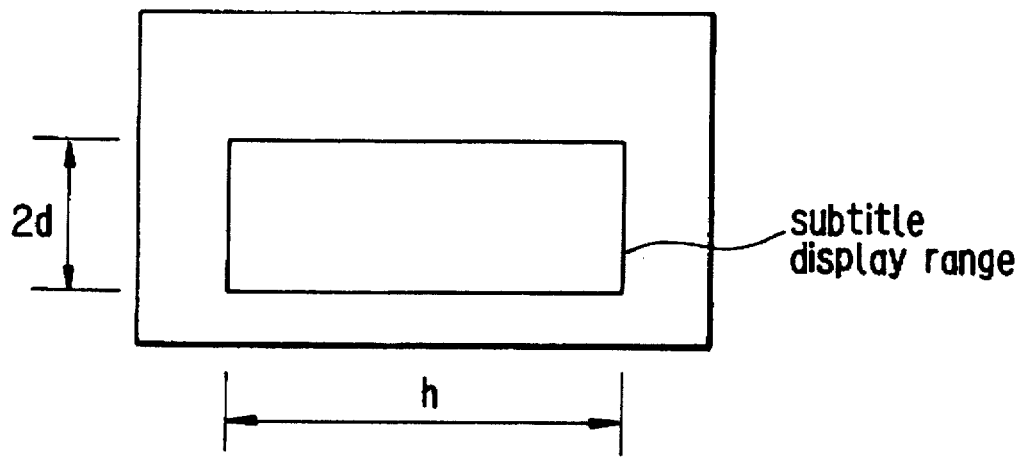
FIGS. 21A through 21C are drawings for explaining another processing in FIG. 16.
Figure 21B:
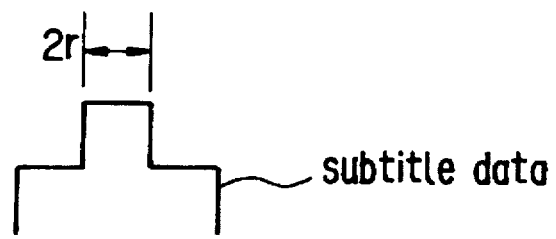
Figure 21C:
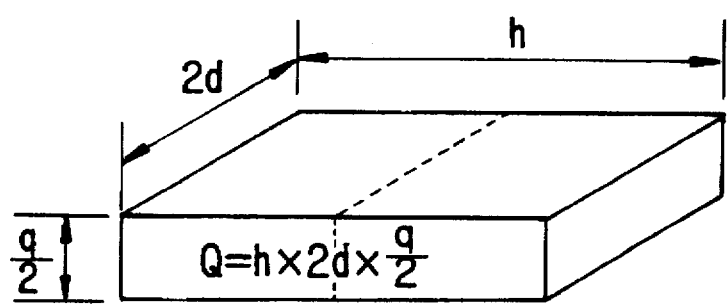
Figure 22:
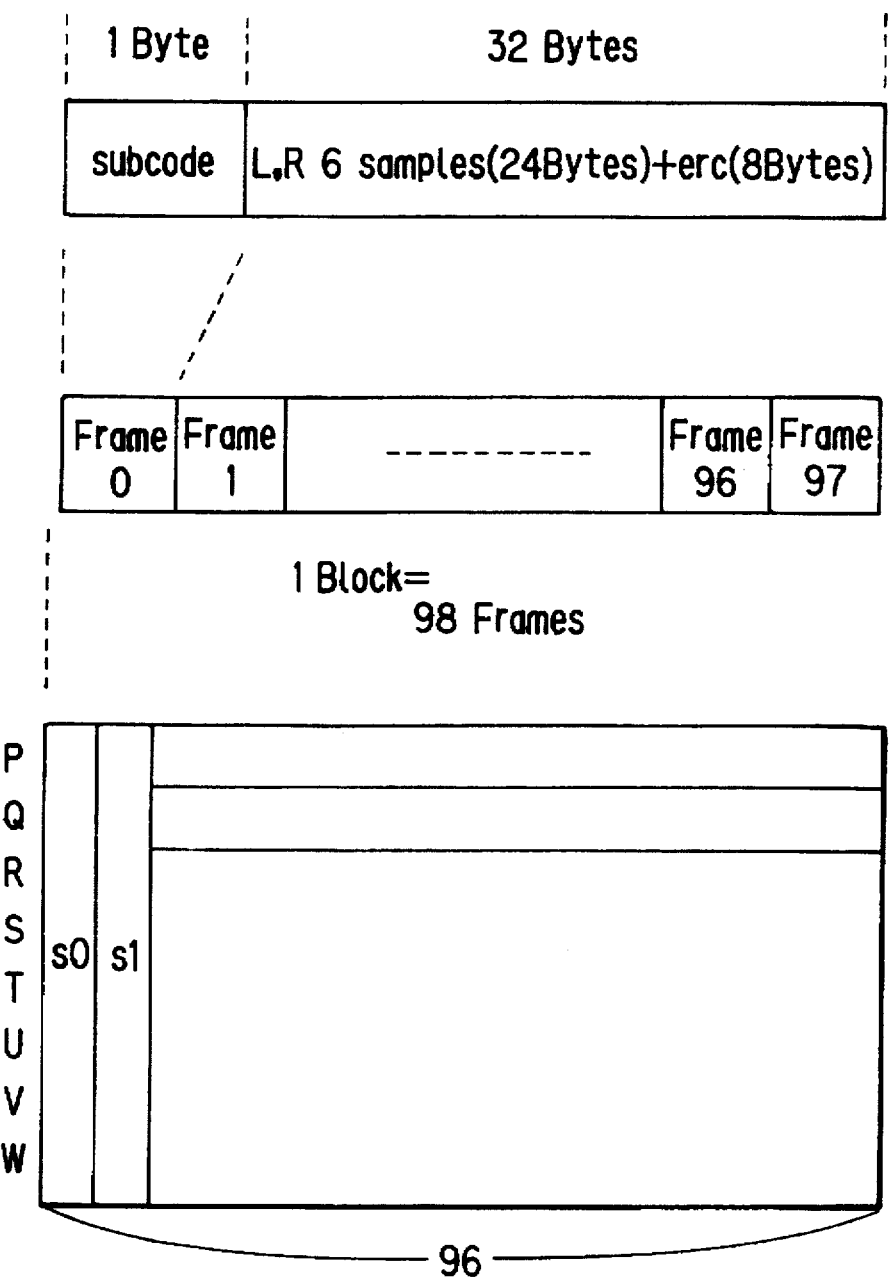
FIG. 22 is a diagram for explaining a conventional subcode format.
Figure 23:
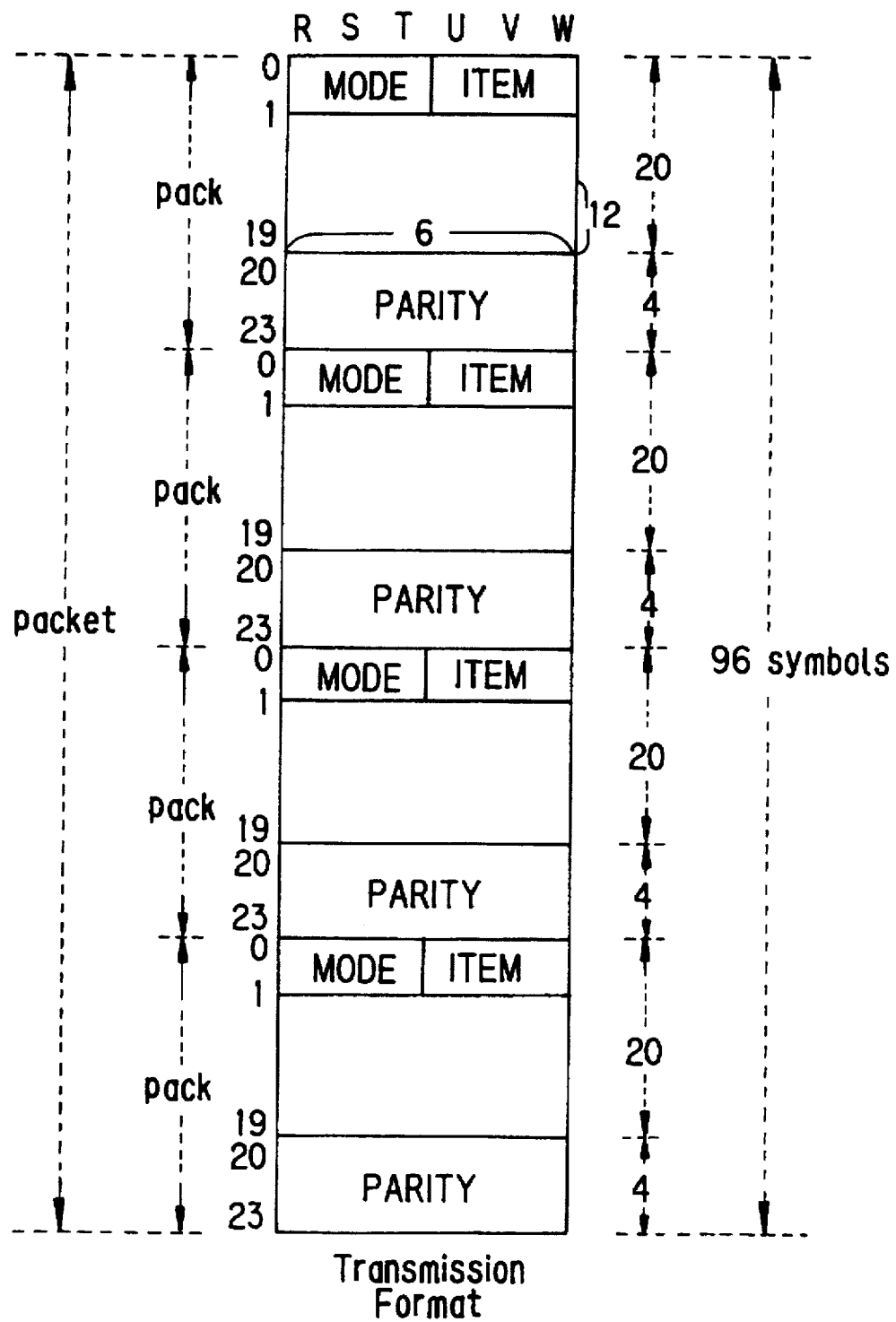
FIG. 23 is a diagram showing a conventional subcode transmission format.

By the way, when the basis data amount Q may be changed and when the vertical direction of the subtitle display range is doubled for example as shown in FIG. 21A, the resolution in the horizontal direction may be set at 2r as shown in FIG. 21B and the quantization bit number q may be set at half of the case shown in FIG. 17C as shown in FIG. 21C. By doing so, the basic data amount Q may be reduced to ¼ of the case shown in FIG. 17. The selection of the aforementioned parameters is carried out all in the encoding unit.

As described above, according to the subtitle data encoding unit described in claim 1, an address in memory means storing data of the color which corresponds to the color of the subtitle is detected and that address is transmitted as color information on the color of the subtitle, so that the colored subtitle may be transmitted with less information amount.

According to the subtitle data encoding unit described in claim 2, pattern information on a pattern of the subtitle and a repeat time which is a number of vertical synchronous signals in the video image on which the subtitle is continuously superimposed are transmitted, in addition to the color information, so that the subtitle superimposed on the video image across a plurality of frames or fields may be transmitted with less data amount.

According to the subtitle data encoding unit described in claim 3, variable length coding of the subtitle is carried out in variable length coding means corresponding to a display range and number of bits specified by range specifying means and bit number determining means, respectively. The range and the number of bits are corrected corresponding to its coded amount. Accordingly, the subtitle display range may be freely changed to any range without modifying the basic structure of the subtitle data encoding unit.

According to the recording medium described in claim 5, it records the data of the subtitle encoded by the subtitle data encoding unit described in claim 1, so that many more information other than the subtitle data may be stored.

According to the subtitle data decoding unit described in claim 6, the pattern information decoding means or the color information decoding means performs the process for decoding the pattern information or the color information respectively in parallel, so that the decoding can be completed quickly. Further, the color information may be modified by the pattern information, so that it allows to display a subtitle whose color changes timewise with less data amount.

According to the subtitle data decoding unit described in claim 7, the color rectangular area (frame) composed of a color is output from the output means by giving an address which is the color information to the output means by modifying it corresponding to the pattern information, so that the subtitle whose color changes timewise may be displayed with less data amount.

According to the subtitle data decoding unit described in claim 8, the output of the output means and brightness data are multiplied, so that a subtitle having a smooth edge may be displayed.

According to the subtitle data decoding unit described in claim 9, the color frame composed of a color is output from the output means by giving the address which is the color information to the output means by modifying it corresponding to discrimination information, so that the subtitle whose color changes timewise may be displayed with less data amount.

According to the subtitle data decoding unit described in claim 10, stored data is repeatedly decoded by a number of times of the repeat time, so that the subtitle may be superimposed on the video image across a plurality of frames or fields.

According to the subtitle data decoding unit described in claim 11, the repeat time is decremented, when a n-time speed reproduction is made, by one with a timing of n times of a timing of the Vertical synchronous signal of the video image and the data is repeatedly decoded until the repeat time becomes zero, so that the subtitle may be superimposed on the video image across a predetermined plurality of frames or fields corresponding to the reproduction speed.

While preferred embodiments have been described, variations thereto will occur to those skilled in the art within the scope of the present inventive concepts which are delineated by the following claims.

What is claimed is:

1. A subtitle data encoding unit for encoding a subtitle to be superimposed on a video image and to be displayed, comprising:

range specifying means for specifying a range in which said subtitle is displayed;

bit number determining means for determining a number of bits per pixel in quantizing said subtitle;

encoding means for encoding in correspondence with values determined by said range specifying means and bit number determining means; and correcting means for correcting the value determined by said range specifying means and bit number determining means in correspondence with an amount of codes encoded by encoding means.

2. The subtitle data encoding unit according to claim 1, further comprising adjusting means for adjusting a horizontal resolution of said subtitle.

3. A subtitle data decoding unit for decoding encoded data, wherein said encoded data contains, in addition to color information, pattern information of a pattern of a subtitle, and wherein said pattern information is composed of either subtitle brightness data and key data which correspond to a mute factor of a video signal in superimposing said subtitle and discrimination information for discriminating either of them, comprising:

pattern information decoding means for decoding said pattern information;

color information decoding means for decoding said color information, wherein at least one of said pattern information decoding means and said color information decoding means performs a process for decoding said pattern information and said color information, respectively, in parallel; and output means for storing color data, said output means outputting data of a color stored at an address when said address is specified, said color information being the address for outputting a color frame composed of data of the color from said output means, wherein the address which is said color information is modifiable to correspond to said pattern information, wherein the address which is said color information is modified corresponding to said discrimination information.

4. A video subtitle processing system comprising:

an input for alternately receiving blanking data, subtitle data and key data, and outputting same at respective levels to a quantization circuit;

wherein said quantization circuit comprises:

a first memory for storing quantization data;

consolidating circuitry for consolidating said levels of said subtitle data and said key data in accordance with said quantization data and outputting same;

color quantization circuitry for receiving color data associated with said subtitle data and quantizing it in accordance with color quantization data stored in a second memory;

switching means for alternately providing the output signals of said quantization circuit and said color quantization circuitry to a converter for converting said output signals into a differential pulse code modulated signal;

encoder for converting said differential pulse code modulated signal into a data pair comprising level data and run data;

a variable length encoder for encoding said run data in accordance with variable length encoding data stored in a third memory; and packing circuitry for combining said encoded run data from said variable length encoder with said level data from said encoder and outputting same.

5. A subtitle processing system in accordance with claim 4, wherein said packing circuitry further comprises:

a multiplexer for adding time code data and position data to said subtitle data.

6. A video subtitle decoder comprising:

input for receiving an input signal comprised of subtitle data, video data and audio data;

subtitle data decoder for converting subtitle data into a subtitle output signal;

video data decoder for converting video data into a video output signal;

audio data decoder for converting audio data into an audio output signal;

said input comprises:

demultiplexer for separating said subtitle data, said video data and said audio data;

output for distributing said subtitle data, said video data and said audio data to said subtitle data decoder, said video data decoder and said audio data decoder respectively; and composite encoder for combining said subtitle output signal and said video output signal and outputting a composite signal of a predetermined format in accordance therewith.

7. A method for encoding a subtitle to be superimposed on a video image to be displayed, comprising the steps of:

specifying a range in which said subtitle is displayed;

determining a number of bits per pixel in quantizing said subtitle;

encoding in correspondence with values determined by said steps of specifying a range and determining a number of bits; and correcting the values determined by said steps of specifying a range and determining a number of bits in correspondence with an amount of codes encoded by said step of encoding.

8. An apparatus for decoding encoded data, wherein said encoded data contains, in addition to color information, pattern information of a pattern of a subtitle, and wherein said pattern information is composed of either subtitle brightness data and key data which correspond to a mute factor of a video signal in superimposing said subtitle and discrimination information for discriminating either of them, comprising:

pattern information decoding means for decoding said pattern information;

color information decoding means for decoding said color information, wherein at least one of said pattern information decoding means and said color information decoding means performs a process for decoding said pattern information and said color information, respectively, in parallel; and output means for storing color data, said output means outputting data of a color stored at an address when said address is specified, said color information being the address for outputting a color frame composed of data of the color from said output means, wherein the address which is said color information is modifiable to correspond to said pattern information, wherein the address which is said color information is modified corresponding to said discrimination information.

9. A method for processing video subtitles, comprising the steps of:

alternately receiving blanking data, subtitle data and key data, and outputting same at respective levels for quantization;

quantizing the blanking data, the subtitle data and the key data;

storing the quantization data;

consolidating levels of said subtitle data and said key data in accordance with quantization data and outputting same;

receiving color data associated with said subtitle data and quantizing it in accordance with stored color quantization data; alternately providing the output signals of said quantizing of blanking data, the subtitle data and the key data and said quantization of color data for conversion into a differential pulse code modulated signal;

converting said differential pulse code modulated signal into a data pair comprising level data and run data;

encoding said run data in accordance with stored variable length encoding data; and combining said encoded run data with said level data and outputting same.

10. A method for processing in accordance with claim 9, wherein the step of combining further comprises the step of:

multiplexing for adding time code data and position data to said subtitle data.

11. A method of decoding an encoded video subtitle, comprising the steps of comprising:

receiving an input signal comprised of subtitle data, video data and audio data;

converting the subtitle data into a subtitle output signal;

converting the video data into a video output signal;

converting the audio data into an audio output signal;

wherein said input signal is generated by the steps of:

separating said subtitle data, said video data and said audio data;

distributing said subtitle data, said video data and said audio data for subtitle data decoding, video data decoding and audio data decoding, respectively; and combining said subtitle output signal and said video output signal and outputting a composite signal of a predetermined format in accordance therewith.

* * * * *